US009647790B2

United States Patent
D'Errico et al.

(10) Patent No.: US 9,647,790 B2
(45) Date of Patent: May 9, 2017

(54) RECONFIGURABLE OPTICAL SWITCH APPARATUS

(71) Applicant: Telefonaktiebolaget L M Ericsson (publ), Stockholm (SE)

(72) Inventors: Antonio D'Errico, Scala Calci (IT); Francesco Testa, Pomezia Roma (IT)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/761,202

(22) PCT Filed: Jan. 15, 2013

(86) PCT No.: PCT/EP2013/050638
§ 371 (c)(1),
(2) Date: Jul. 15, 2015

(87) PCT Pub. No.: WO2014/111126
PCT Pub. Date: Jul. 24, 2014

(65) Prior Publication Data
US 2015/0358109 A1 Dec. 10, 2015

(51) Int. Cl.
H04B 10/08 (2006.01)
H04J 14/02 (2006.01)
H04Q 11/00 (2006.01)

(52) U.S. Cl.
CPC ...... H04J 14/0212 (2013.01); H04J 14/0217 (2013.01); H04J 14/0221 (2013.01);
(Continued)

(58) Field of Classification Search
CPC .............. H04J 14/0212; H04J 14/0217; H04J 14/0221; H04J 14/0208; H04Q 11/0005;
(Continued)

(56) References Cited

U.S. PATENT DOCUMENTS 6,115,517 A    9/2000  Shiragaki et al.
6,829,405 B1 * 12/2004 Wachsman .......... H04J 14/0213
                                                          385/17
(Continued)

FOREIGN PATENT DOCUMENTS

EP    1 288 704 A1 *  5/2003  .............. G02F 1/31
WO   2012/123022 A1   9/2012
(Continued)

OTHER PUBLICATIONS

International Search Report for Application No. PCT/EP2013/050638, mailed Oct. 1, 2013, 3 pages.
(Continued)

Primary Examiner — M. R. Sedighian
(74) Attorney, Agent, or Firm — Nicholson De Vos Webster & Elliot LLP

(57) ABSTRACT

A reconfigurable optical switch apparatus comprising m input ports, m output ports, k add ports, k drop ports and a switch matrix comprising m×k wavelength selective optical switches arranged in m rows and k columns. Each switch comprises first, second, third and fourth ports. The columns are grouped in adjacent pairs, in each pair a first column being connected to a respective drop port on a first side of the switch matrix and each wavelength selective switch in said first column having the fourth port arranged on said first side and a second column, adjacent the first column, being connected to a respective drop port on a second side, opposite the first side, of the switch matrix and each wavelength selective switch in said second column having the fourth port arranged on said second side.

18 Claims, 19 Drawing Sheets

(52) U.S. Cl.
CPC ..... *H04Q 11/0005* (2013.01); *H04Q 11/0066* (2013.01); *H04J 14/0208* (2013.01); *H04Q 2011/0016* (2013.01); *H04Q 2011/0058* (2013.01); *H04Q 2011/0083* (2013.01)

(58) Field of Classification Search
CPC ....... H04Q 11/0066; H04Q 2011/0016; H04Q 2011/0058; H04Q 2011/0083
USPC ...................................................... 398/45, 19
See application file for complete search history.

(56) References Cited

U.S. PATENT DOCUMENTS

| | | | |
|---|---|---|---|
| 2006/0056848 A1 | 3/2006 | Nishi | |
| 2009/0041457 A1* | 2/2009 | Maki | H04J 14/0204 398/45 |
| 2010/0129082 A1 | 5/2010 | Zhong et al. | |
| 2011/0008041 A1 | 1/2011 | Uchiyama et al. | |

FOREIGN PATENT DOCUMENTS

| | | | | |
|---|---|---|---|---|
| WO | WO 2012/123022 A1 * | 9/2012 | | H04J 14/02 |
| WO | 2012/152343 A1 | 11/2012 | | |

OTHER PUBLICATIONS

Baxter et al., "Highly programmable Wavelength Selective Switch based on Liquid Crystal on Silicon switching elements", Optical Society of America, 2005, 3 pages.
Hennin et al., "Addressing Manufacturability and Reliability of MEMS-based WSS", Optical Society of America, 2006, 3 pages.
"No Limits: The Next_Generation ROADM Network", Enablence Techonologies Inc., 2010, pp. 1-16.
Sherwood-Droz et al., "Optical 4×4 hitless silicon router for optical Netowrks-on-Chip (NoC)", Optical Society of America, vol. 16, No. 20, Sep. 29, 2008,8 pages.
Nakamura et al., "Wavelength selective switching with one-chip silicon photonic circuit including 8×8 matrix switch", Optical Society of America, 2011, 3 pages.
Biberman et al., "CMOS-Compatible Scalable Photonic Switch Architecture Using 3D-Integrated Deposited Silicon Materials for High-Performance Data Center Networks", Optical Society of America, 2011, 3 pages.
Bogaerts et al., "Low-loss, low-cross-talk crossings for silicon-on-insulator nanophotonic waveguides", Optical Society of America, Optic Letters, vol. 32, No. 19, Oct. 1, 2007, pp. 2801-2803.
Sakai et al., "Sharply bent optical waveguide on silicon-on-insulator substrate", Proceedings of SPIE vol. 4283, 2001, 9 pages.
Dong et al., "Low Loss Silicon Waveguides for Application of Optical Interconnects", IEEE, 2010, pp. 191-192.
Doerr et al., "Monolithic Silicon Coherent Receiver", Optical Society of America, IEEE, 2009, 3 pages.
Basch et al., "Architectural Tradeoffs for Reconfigurable Dense Wavelength-Division Multiplexing Systems", IEEE Journal of Selected Topics in Quantum Electronics, vol. 12, No. 4, Jul./Aug. 2006, pp. 615-626.
Gringeri et al., "Flexible Architectures for Optical Transport Nodes and Networks", 100 Gigabit Ethernet, IEEE Communications Magazine, Jul. 2010, pp. 40-50.
Chen, W., et al., "Monolithically Integrated 32×Four-Channel Client Reconfigurable Optical Add/Drop Multiplexer on Planar Lightwave Circuit", IEEE Photonics Technology Letters, IEEE Service Center, Piscataway, NJ, US, vol. 15, No. 10, Oct. 1, 2003, pp. 1413-1415, XP011101385.

* cited by examiner a) Switch OFF    b) Switch ON a) Switch OFF    b) Switch ON

RECONFIGURABLE OPTICAL SWITCH APPARATUS

CROSS-REFERENCE TO RELATED APPLICATIONS

This application is a National stage of International Application No. PCT/EP2013/050638, filed Jan. 15, 2013, which is hereby incorporated by reference.

TECHNICAL FIELD

The invention relates to reconfigurable optical switch apparatus. The invention further relates to a reconfigurable optical add drop multiplexer comprising the reconfigurable optical switch apparatus. The method further relates to an optical communication network element comprising the reconfigurable optical add drop multiplexer. The invention further relates to a method of controlling the reconfigurable optical switch apparatus.

BACKGROUND

All-optical transport nodes for optical communication networks are currently based on multi-directional-switching Reconfigurable Add and Drop Multiplexers, ROADMs, to support the use of the transport nodes in a meshed network architecture. ROADMs currently use unidirectional 1×N wavelength selective switches, WSS, that are implemented in a mechanical package using free space optics and use either a Liquid Crystal or a micro-electro-mechanical switch, MEMS, to direct each optical signal to its respective destination port. Bulk optic gratings are also used to multiplex or demultiplex optical signals. By properly combining WSS, ROADMs are capable of operating on traffic transmitted from and toward different directions, A multi directional optical switching ROADM node can be obtained by interconnecting a plurality of WSS.

The flexibility of an optical communication network is based on remotely reconfigured ROADM's. At each node of the network comprising a ROADM it is possible to route optical communication signals at by-pass wavelength from any direction to any direction, known as "directionless" routing. However at end points in a network the transceivers used for adding/dropping optical communication signals are connected to fixed wavelength, "coloured", ports of the ROADM, and they are rigidly assigned to a particular ROADM input/output direction. Any wavelength and/or direction change for add and drop signals can be only performed by manually reconfiguring the WSS in the ROADM.

To implement colorless, directionless and contentionless ROADMs using the free space based 1×N WSS's as element switches, the only possible way is to interconnect with them a number of add/drop optical switches, splitters and tunable filters. In a fully flexible ROADM the number of expensive devices increases, the number of optical amplifiers also increases due to the high loss for signal distribution and switching, leading to an increase of ROADM cost, footprint and power consumption.

WO2012/123022 discloses a ROADM comprising three optical switch arrays: a cross-connect element comprising optical switches connected together as a first switch array; a drop element comprising optical switches connected together as a second switch array; and an add element comprising optical switches connected together as a third switch array. Each optical switch can switch a single wavelength on a grid of waveguides in order to perform all optical wavelength selective switching. An optical signal received at the cross-connect element may be routed to the drop element, where it is routed to a drop port, or may be routed to the add element, where it is routed to an output. An optical signal to be added is received at the add element where it is routed to an output.

SUMMARY

It is an object to provide an improved reconfigurable optical switch apparatus. It is a further object to provide an improved a reconfigurable optical add drop multiplexer. It is a further object to provide an improved optical communication network element. It is a further object to provide an improved method of controlling a reconfigurable optical switch apparatus.

A first aspect of the invention provides reconfigurable optical switch apparatus comprising m input ports, m output ports, k add ports, k drop ports and a switch matrix. The m input ports are each arranged to receive an optical signal having a respective one of y wavelengths. The m output ports each arranged to output an optical signal having a respective one of the y wavelengths. The k add ports are each arranged to receive an optical signal to be added at one of the y wavelengths. The k drop ports are each arranged to output an optical signal to be dropped at one of the y wavelengths. The switch matrix comprises m×k wavelength selective optical switches, which are arranged in m rows and k columns. Each of the m rows is connected between a respective input port and a respective output port. Each of the k columns is connected at one end to a respective drop port and at an opposite end to a respective add port. Each wavelength selective optical switch comprises a first port and a fourth port arranged in a respective said column and a second port and a third port arranged along a respective said row. Each switch has an OFF state and an ON state. In the OFF state, each optical signal having one of the y wavelengths received at the third port is output at the second port and each optical signal having one of the y wavelengths received at the fourth port is output at the first port. In the ON state, an optical signal having a preselected one of the y wavelengths received at the third port is output at the first port and an optical signal having said wavelength received at the fourth port is output at the second port. In the ON state, each optical signal received which does not have the preselected wavelength is routed in the same manner as in the OFF state. The columns are grouped in adjacent pairs. In each pair a first column is connected to a respective drop port on a first side of the switch matrix and each wavelength selective switch in said first column has the fourth port arranged on said first side. In each pair a second column, adjacent the first column, is connected to a respective drop port on a second side, opposite the first side, of the switch matrix and each wavelength selective switch in said second column has the fourth port arranged on said second side. Each of m, k and y is an integer which is at least 2.

The reconfigurable optical switch apparatus may enable all-optical colourless, directionless and contentionless switching of an optical signal in a multi directional ROADM. The reconfigurable optical switch apparatus may enable routing of an optical signal having any of the y wavelengths from any input towards any available output port or drop port, and of an optical signal to be added having any of the y wavelengths from any add port towards any available output port. The reconfigurable optical switch apparatus may enable an optical signal to be dropped and a further optical signal to be added simultaneously at the same wavelength by configuring a single optical switch in the ON state. An optical signal may be routed across the reconfigurable optical switch apparatus by configuring a maximum of two optical switches. The reconfigurable optical switch apparatus may enable adding and dropping optical signals at any available wavelength in any direction in a network, that is to say, full colourless and directionless operation.

In an embodiment, the add port and the drop port of each column are located on the same side of the switch matrix. The switch matrix further comprises a respective optical waveguide for each column, the waveguide connecting the respective add port to the said opposite end of the column. This may enable a single transceiver to be connected to each column, thereby supporting a maximum of k transceivers.

In an embodiment, in each said pair of columns the add port and the drop port of the first column are located on the first side of the switch matrix and the add port and the drop port of the second column are located on the second side of the switch matrix. This may enable a single transceiver to be connected to each column, thereby supporting a maximum of k transceivers.

In an embodiment, k is greater than y. The reconfigurable optical switch apparatus may be configured in a non-blocking arrangement, thus avoiding transmission contention, that is to say contentionless operation, in the case where two optical signals at the same wavelength are added/dropped from/to an arbitrary pair of ports.

In an embodiment, k is at least 2y. The reconfigurable optical switch apparatus may be configured in a strictly non-blocking arrangement.

In an embodiment, a first set of the input ports are on a third side of the switch matrix and a second set of the input ports are on a fourth side of the switch matrix. A corresponding first set of the output ports are on the fourth side of the switch matrix and a corresponding second set of the output ports are on the third side of the switch matrix. A first plurality of the wavelength selective optical switches of each column have their third and second ports arranged to route an optical signal in a direction from the third side to the fourth side of the switch matrix. A second plurality of the wavelength selective optical switches in each column have their third and second ports arranged to route an optical signal in a direction from the fourth side to the third side of the switch matrix. An optical signal received at an input port on the third side may be routed to an output port on the third side or the fourth side, and similarly for an optical signal received at an input port on the fourth side. The reconfigurable optical switch apparatus may be configured to route an optical signal from any input port to any output port.

In an embodiment, the input ports are arranged in a plurality of sub-sets, each sub-set comprising y input ports. Each input port in a said sub-set is arranged to receive an optical signal having a different one of the y wavelengths. The output ports are arranged in a plurality of sub-sets, each sub-set comprising y output ports. Each output port in a said sub-set is arranged to output an optical signal having a different one of the y wavelengths.

In an embodiment, each sub-set of input ports is configured to be connected to a different input direction and each sub-set of output ports is configured to be connected to a different output direction. The reconfigurable optical switch apparatus may enable routing of an optical signal having any of the y wavelengths from any direction input towards any available direction output port or drop port, and of an optical signal to be added having any of the y wavelengths from any add port towards any available direction output port.

In an embodiment, the apparatus further comprises optical signal monitoring apparatus at each output port and each drop port. The optical signal monitoring apparatus is configured to detect the presence of an optical signal at a said port. The optical signal monitoring apparatus is configured to generate an alarm signal if the presence of an optical signal intended to be output at a said port is not detected. This may enable a failure in the structure or operation of the reconfigurable optical switch apparatus to be detected.

In an embodiment, the apparatus further comprises optical signal monitoring apparatus at each input port and each add port. This may enable a failure at an input port or an add port to be detected.

In an embodiment, the apparatus further comprises optical signal power equalisation apparatus at each output port and at each drop port. This may enable different optical losses among different optical paths across the switch matrix to be compensated for. This may enable each optical signal output at an output port or a drop port to have the same optical signal power.

In an embodiment, the apparatus further comprises optical signal power equalisation apparatus at each input port and at each add port. The optical signal power equalisation apparatus may be used to equalise the optical power of optical signals received at the reconfigurable optical switch apparatus, before the optical signals are transmitted across the switch matrix.

In an embodiment, the optical signal power equalisation apparatus comprises a photodiode and a variable optical attenuator.

In an embodiment, each wavelength selective optical switch comprises a wavelength selective microring resonator based electro-optic switch.

In an embodiment, each wavelength selective optical switch comprises a Mach-Zehnder interferometer based electro-optic switch. Each switch may be configured to switch a plurality of the y wavelengths simultaneously.

In an embodiment, each add port is arranged to receive a plurality of optical signals to be added at each of a plurality of the y wavelengths and each drop port is arranged to output a plurality of optical signals to be dropped at each of a plurality of the y wavelengths.

In an embodiment, the reconfigurable optical switch apparatus is fabricated on one or more integrated photonic structures. The apparatus may be fabricated on just a few integrated photonic structures.

In an embodiment, the reconfigurable optical switch apparatus is fabricated on a single integrated photonic structure.

A second aspect of the invention provides a reconfigurable optical add drop multiplexer comprising a plurality of optical signal demultiplexers, reconfigurable optical switch apparatus, a plurality of optical signal multiplexers and a controller. The optical signal demultiplexers are each arranged to receive an input wavelength division multiplexed optical signal and are each arranged to demultiplex the input optical signal into a plurality of optical signals each having a different one of y wavelengths. The reconfigurable optical switch apparatus comprises m input ports, m output ports, k add ports, k drop ports and a switch matrix. The m input ports are each arranged to receive an optical signal having a respective one of y wavelengths. The m output ports each arranged to output an optical signal having a respective one of the y wavelengths. The k add ports are each arranged to receive an optical signal to be added at one of the y wavelengths. The k drop ports are each arranged to output an optical signal to be dropped at one of the y wavelengths. The switch matrix comprises m×k wavelength selective optical switches, which are arranged in m rows and k columns. Each of the m rows is connected between a respective input port and a respective output port. Each of the k columns is connected at one end to a respective drop port and at an opposite end to a respective add port. Each wavelength selective optical switch comprises a first port and a fourth port arranged in a respective said column and a second port and a third port arranged along a respective said row. Each switch has an OFF state and an ON state. In the OFF state, each optical signal having one of the y wavelengths received at the third port is output at the second port and each optical signal having one of the y wavelengths received at the fourth port is output at the first port. In the ON state, an optical signal having a preselected one of the y wavelengths received at the third port is output at the first port and an optical signal having said wavelength received at the fourth port is output at the second port. In the ON state, each optical signal received which does not have the preselected wavelength is routed in the same manner as in the OFF state. The columns are grouped in adjacent pairs. In each pair a first column is connected to a respective drop port on a first side of the switch matrix and each wavelength selective switch in said first column has the fourth port arranged on said first side. In each pair a second column, adjacent the first column, is connected to a respective drop port on a second side, opposite the first side, of the switch matrix and each wavelength selective switch in said second column has the fourth port arranged on said second side. Each of m, k and y is an integer which is at least 2. The optical signal multiplexers are each arranged to receive a respective optical signal from a plurality of the output ports and are each arranged to multiplex the received optical signals into an output wavelength division multiplexed optical signal. The controller is configured to generate a switch control signal arranged to cause a wavelength selective optical switch to change between the OFF state and the ON state.

The reconfigurable optical add drop multiplexer, ROADM, may perform all-optical colourless, directionless and contentionless routing of an optical signal. The ROADM may perform routing of an optical signal having any of the y wavelengths from any input towards any available output port or drop port, and of an optical signal to be added having any of the y wavelengths from any add port towards any available output port. The ROADM may enable an optical signal to be dropped and a further optical signal to be added simultaneously at the same wavelength by configuring a single optical switch in the ON state. An optical signal may be routed across the ROADM by configuring a maximum of two optical switches. The ROADM may enable adding and dropping optical signals at any available wavelength in any direction in a network, that is to say, full colourless and directionless operation. This may enable a network operator to eliminate manual intervention and to optimize the resource utilization, supporting re-routing functions in case of faults in a cost effective way. The ROADM may enable all optical routing and may reconfigure the optical path of any WDM optical signal coming from any direction towards any direction, and may add and drop optical signals from and to any direction.

In an embodiment, the add port and the drop port of each column are located on the same side of the switch matrix. The switch matrix further comprises a respective optical waveguide for each column, the waveguide connecting the respective add port to the said opposite end of the column. This may enable a single transceiver to be connected to each column, thereby supporting a maximum of k transceivers.

In an embodiment, in each said pair of columns the add port and the drop port of the first column are located on the first side of the switch matrix and the add port and the drop port of the second column are located on the second side of the switch matrix. This may enable a single transceiver to be connected to each column, thereby supporting a maximum of k transceivers.

In an embodiment, k is greater than y. The ROADM may be configured in a non-blocking arrangement, thus avoiding transmission contention, that is to say contentionless operation, in the case where two optical signals at the same wavelength are added/dropped from/to an arbitrary pair of ports.

In an embodiment, k is at least 2y. The ROADM may be configured in a strictly non-blocking arrangement.

In an embodiment, a first set of the input ports are on a third side of the switch matrix and a second set of the input ports are on a fourth side of the switch matrix. A corresponding first set of the output ports are on the fourth side of the switch matrix and a corresponding second set of the output ports are on the third side of the switch matrix. A first plurality of the wavelength selective optical switches of each column have their third and second ports arranged to route an optical signal in a direction from the third side to the fourth side of the switch matrix. A second plurality of the wavelength selective optical switches in each column have their third and second ports arranged to route an optical signal in a direction from the fourth side to the third side of the switch matrix. An optical signal received at an input port on the third side may be routed to an output port on the third side or the fourth side, and similarly for an optical signal received at an input port on the fourth side. The ROADM may be configured to route an optical signal from any input port to any output port.

In an embodiment, the input ports are arranged in a plurality of sub-sets, each sub-set comprising y input ports. Each input port in a said sub-set is arranged to receive an optical signal having a different one of the y wavelengths. The output ports are arranged in a plurality of sub-sets, each sub-set comprising y output ports. Each output port in a said sub-set is arranged to output an optical signal having a different one of the y wavelengths. The ROADM may be used to route wavelength division multiplexed optical signals.

In an embodiment, the reconfigurable optical add drop multiplexer has a plurality of directions, each direction having an input and an output. Each sub-set of input ports is connected to a respective one of the input directions and each sub-set of output ports is connected to a respective on of the output directions. The ROADM may perform routing of an optical signal having any of the y wavelengths from any direction input towards any available direction output port or drop port, and of an optical signal to be added having any of the y wavelengths from any add port towards any available direction output port.

In an embodiment, the ROADM further comprises optical signal monitoring apparatus at each output port and each drop port. The optical signal monitoring apparatus is configured to detect the presence of an optical signal at a said port. The optical signal monitoring apparatus is configured to generate an alarm signal if the presence of an optical signal intended to be output at a said port is not detected. This may enable a failure in the structure or operation of the reconfigurable optical switch apparatus to be detected.

In an embodiment, the ROADM further comprises optical signal monitoring apparatus at each input port and each add port. This may enable a failure at an input port or an add port to be detected.

In an embodiment, the ROADM further comprises optical signal power equalisation apparatus at each output port and at each drop port. This may enable different optical losses among different optical paths across the switch matrix to be compensated for. This may enable each optical signal output at an output port or a drop port to have the same optical signal power.

In an embodiment, the ROADM further comprises optical signal power equalisation apparatus at each input port and at each add port. The optical signal power equalisation apparatus may be used to equalise the optical power of optical signals received at the reconfigurable optical switch apparatus, before the optical signals are transmitted across the switch matrix.

In an embodiment, the optical signal power equalisation apparatus comprises a photodiode and a variable optical attenuator.

In an embodiment, each wavelength selective optical switch comprises a wavelength selective microring resonator based electro-optic switch.

In an embodiment, each wavelength selective optical switch comprises a Mach-Zehnder interferometer based electro-optic switch. Each switch may be configured to switch a plurality of the y wavelengths simultaneously.

In an embodiment, each add port is arranged to receive a plurality of optical signals to be added at each of a plurality of the y wavelengths and each drop port is arranged to output a plurality of optical signals to be dropped at each of a plurality of the y wavelengths.

In an embodiment, the reconfigurable optical switch apparatus is fabricated on one or more integrated photonic structures. The apparatus may be fabricated on just a few integrated photonic structures.

In an embodiment, the ROADM is fabricated on a single integrated photonic structure.

In an embodiment, the ROADM comprises a transceiver coupled to the add port and the drop port of each column. In an embodiment, each transceiver is configurable to add an optical signal at a different wavelength to the optical signal received at the drop port. This may enable the ROADM to fully use all available connections in an optical network.

A third aspect of the invention provides an optical communication network element comprising a reconfigurable optical add drop multiplexer. The reconfigurable optical add drop multiplexer comprises a plurality of optical signal demultiplexers, reconfigurable optical switch apparatus, a plurality of optical signal multiplexers and a controller. The optical signal demultiplexers are each arranged to receive an input wavelength division multiplexed optical signal and are each arranged to demultiplex the input optical signal into a plurality of optical signals each having a different one of y wavelengths. The reconfigurable optical switch apparatus comprises m input ports, m output ports, k add ports, k drop ports and a switch matrix. The m input ports are each arranged to receive an optical signal having a respective one of y wavelengths. The m output ports each arranged to output an optical signal having a respective one of the y wavelengths. The k add ports are each arranged to receive an optical signal to be added at one of the y wavelengths. The k drop ports are each arranged to output an optical signal to be dropped at one of the y wavelengths. The switch matrix comprises m×k wavelength selective optical switches, which are arranged in m rows and k columns. Each of the m rows is connected between a respective input port and a respective output port. Each of the k columns is connected at one end to a respective drop port and at an opposite end to a respective add port. Each wavelength selective optical switch comprises a first port and a fourth port arranged in a respective said column and a second port and a third port arranged along a respective said row. Each switch has an OFF state and an ON state. In the OFF state, each optical signal having one of the y wavelengths received at the third port is output at the second port and each optical signal having one of the y wavelengths received at the fourth port is output at the first port. In the ON state, an optical signal having a preselected one of the y wavelengths received at the third port is output at the first port and an optical signal having said wavelength received at the fourth port is output at the second port. In the ON state, each optical signal received which does not have the preselected wavelength is routed in the same manner as in the OFF state. The columns are grouped in adjacent pairs. In each pair a first column is connected to a respective drop port on a first side of the switch matrix and each wavelength selective switch in said first column has the fourth port arranged on said first side. In each pair a second column, adjacent the first column, is connected to a respective drop port on a second side, opposite the first side, of the switch matrix and each wavelength selective switch in said second column has the fourth port arranged on said second side. Each of m, k and y is an integer which is at least 2. The optical signal multiplexers are each arranged to receive a respective optical signal from a plurality of the output ports and are each arranged to multiplex the received optical signals into an output wavelength division multiplexed optical signal. The controller is configured to generate a switch control signal arranged to cause a wavelength selective optical switch to change between the OFF state and the ON state.

The reconfigurable optical add drop multiplexer, ROADM, may enable all-optical colourless, directionless and contentionless routing of an optical signal. The ROADM may enable routing of an optical signal having any of the y wavelengths from any input towards any available output port or drop port, and of an optical signal to be added having any of the y wavelengths from any add port towards any available output port. The ROADM may enable an optical signal to be dropped and a further optical signal to be added simultaneously at the same wavelength by configuring a single optical switch in the ON state. An optical signal may be routed across the ROADM by configuring a maximum of two optical switches. The ROADM may enable adding and dropping optical signals at any available wavelength in any direction in a network, that is to say, full colourless and directionless operation. This may enable a network operator to eliminate manual intervention and to optimize the resource utilization, supporting re-routing functions in case of faults in a cost effective way. The ROADM may enable all optical routing and may reconfigure the optical path of any WDM optical signal coming from any direction towards any direction, and may add and drop optical signals from and to any direction.

In an embodiment, the add port and the drop port of each column are located on the same side of the switch matrix. The switch matrix further comprises a respective optical waveguide for each column, the waveguide connecting the respective add port to the said opposite end of the column. This may enable a single transceiver to be connected to each column, thereby supporting a maximum of k transceivers.

In an embodiment, in each said pair of columns the add port and the drop port of the first column are located on the first side of the switch matrix and the add port and the drop port of the second column are located on the second side of the switch matrix. This may enable a single transceiver to be connected to each column, thereby supporting a maximum of k transceivers.

In an embodiment, k is greater than y. The ROADM may be configured in a non-blocking arrangement, thus avoiding transmission contention, that is to say contentionless operation, in the case where two optical signals at the same wavelength are added/dropped from/to an arbitrary pair of ports.

In an embodiment, k is at least 2y. The ROADM may be configured in a strictly non-blocking arrangement.

In an embodiment, a first set of the input ports are on a third side of the switch matrix and a second set of the input ports are on a fourth side of the switch matrix. A corresponding first set of the output ports are on the fourth side of the switch matrix and a corresponding second set of the output ports are on the third side of the switch matrix. A first plurality of the wavelength selective optical switches of each column have their third and second ports arranged to route an optical signal in a direction from the third side to the fourth side of the switch matrix. A second plurality of the wavelength selective optical switches in each column have their third and second ports arranged to route an optical signal in a direction from the fourth side to the third side of the switch matrix. An optical signal received at an input port on the third side may be routed to an output port on the third side or the fourth side, and similarly for an optical signal received at an input port on the fourth side. The ROADM may be configured to route an optical signal from any input port to any output port.

In an embodiment, the input ports are arranged in a plurality of sub-sets, each sub-set comprising y input ports. Each input port in a said sub-set is arranged to receive an optical signal having a different one of the y wavelengths. The output ports are arranged in a plurality of sub-sets, each sub-set comprising y output ports. Each output port in a said sub-set is arranged to output an optical signal having a different one of the y wavelengths. The ROADM may be used to route wavelength division multiplexed optical signals.

In an embodiment, the reconfigurable optical add drop multiplexer has a plurality of directions, each direction having an input and an output. Each sub-set of input ports is connected to a respective one of the input directions and each sub-set of output ports is connected to a respective on of the output directions. The ROADM may perform routing of an optical signal having any of the y wavelengths from any direction input towards any available direction output port or drop port, and of an optical signal to be added having any of the y wavelengths from any add port towards any available direction output port. In an embodiment, the ROADM further comprises optical signal monitoring apparatus at each output port and each drop port. The optical signal monitoring apparatus is configured to detect the presence of an optical signal at a said port. The optical signal monitoring apparatus is configured to generate an alarm signal if the presence of an optical signal intended to be output at a said port is not detected. This may enable a failure in the structure or operation of the reconfigurable optical switch apparatus to be detected.

In an embodiment, the ROADM further comprises optical signal monitoring apparatus at each input port and each add port. This may enable a failure at an input port or an add port to be detected.

In an embodiment, the ROADM further comprises optical signal power equalisation apparatus at each output port and at each drop port. This may enable different optical losses among different optical paths across the switch matrix to be compensated for. This may enable each optical signal output at an output port or a drop port to have the same optical signal power.

In an embodiment, the ROADM further comprises optical signal power equalisation apparatus at each input port and at each add port. The optical signal power equalisation apparatus may be used to equalise the optical power of optical signals received at the reconfigurable optical switch apparatus, before the optical signals are transmitted across the switch matrix.

In an embodiment, the optical signal power equalisation apparatus comprises a photodiode and a variable optical attenuator.

In an embodiment, each wavelength selective optical switch comprises a wavelength selective microring resonator based electro-optic switch.

In an embodiment, each wavelength selective optical switch comprises a Mach-Zehnder interferometer based electro-optic switch. Each switch may be configured to switch a plurality of the y wavelengths simultaneously.

In an embodiment, each add port is arranged to receive a plurality of optical signals to be added at each of a plurality of the y wavelengths and each drop port is arranged to output a plurality of optical signals to be dropped at each of a plurality of the y wavelengths.

In an embodiment, the ROADM is fabricated on one or more integrated photonic structures. The apparatus may be fabricated on just a few integrated photonic structures. In an embodiment, the ROADM is fabricated on a single integrated photonic structure.

In an embodiment, the ROADM comprises a transceiver coupled to the add port and the drop port of each column. In an embodiment, each transceiver is configurable to add an optical signal at a different wavelength to the optical signal received at the drop port. This may enable the ROADM to fully use all available connections in an optical network.

A fourth aspect of the invention provides a method of controlling reconfigurable optical switch apparatus as described above. The method comprises selecting one of the input ports. The method comprises selecting one of the output ports and the drop ports to be connected to the selected input port. The method comprises selecting a path for an optical signal at a selected one of the y wavelengths across the switch matrix from the selected input port to the selected one of the output ports and the drop ports. The method comprises generating and transmitting a switch control signal for each wavelength selective optical switch required to change between the OFF state and the ON state to establish the selected path.

In an embodiment, the method comprises selecting one of the drop ports to be connected to the selected input port and selecting one of the add ports and one of the output ports to be connected. The method comprises selecting a first path for a first optical signal at a selected one of the y wavelengths across the switch matrix from the selected input port to the selected the drop port and selecting a second path for a second optical signal at the selected wavelength across the switch matrix from the selected add port to the selected the output port. The first path and the second path share one of the wavelength selective optical switches. The method comprises generating and transmitting a switch control signal for said shared wavelength selective optical switch. The switch control signal is arranged to cause said shared wavelength selective optical switch to be in the ON state to simultaneously establish the first path and the second path.

In an embodiment, the method comprises selecting a further one of the input ports. selecting a further one of the output ports to be connected to said further one of the input ports. The method comprises selecting a further path for a further optical signal at the selected wavelength across the switch matrix from said further one of the input ports to said further one of the output ports. The path is selected to include a said column which does not form part of a said path previously established for a said optical signal at the selected wavelength. The method comprises generating and transmitting a switch control signal for each wavelength selective optical switch required to change between the OFF state and the ON state to establish the further path.

A fifth aspect of the invention provides a data carrier having computer readable instructions embodied therein. The said computer readable instructions are for providing access to resources available on a processor. The computer readable instructions comprise instructions to cause the processor to perform any of the above steps of the method of controlling reconfigurable optical switch apparatus as described above.

In an embodiment, the data carrier is a non-transitory data carrier.

Embodiments of the invention will now be described, by way of example only, with reference to the accompanying drawings.

DETAILED DESCRIPTION

Figure 1:
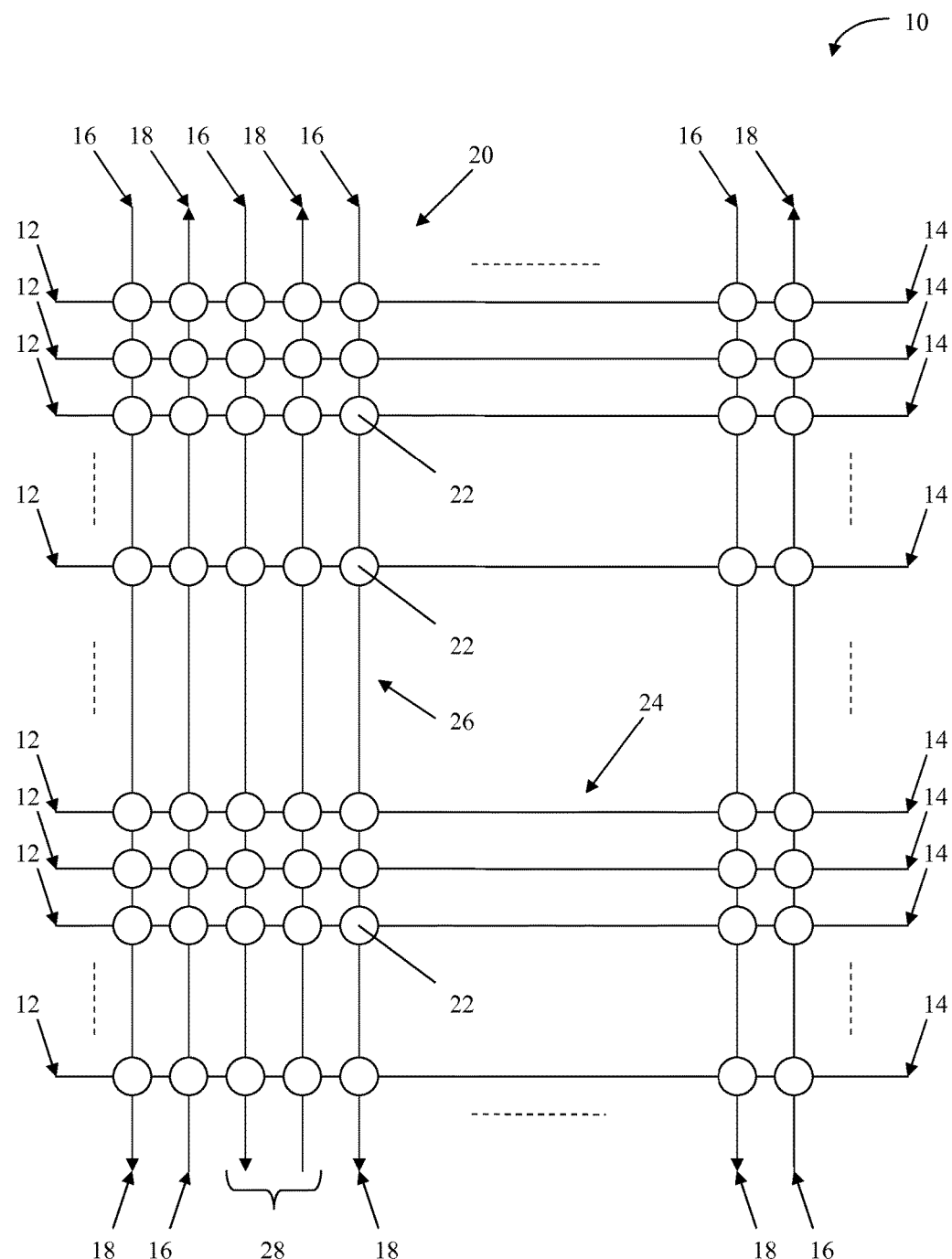
FIG. 1 is a schematic representation of reconfigurable optical switch apparatus according to a first embodiment of the invention.
Figure 2:
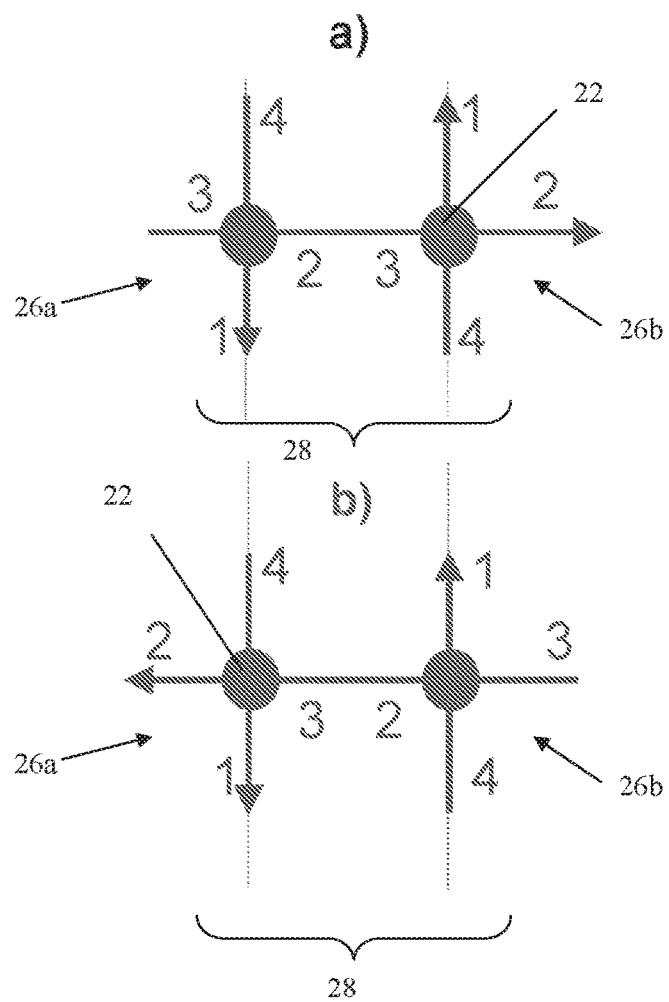
FIG. 2 shows (a) two switches of an adjacent pair of columns of the reconfigurable optical switch apparatus of FIG. 1 having a first arrangement of ports, and (b) two stitches of an adjacent pair of columns of the apparatus of FIG. 1 having a second arrangement of ports.
Figure 3:
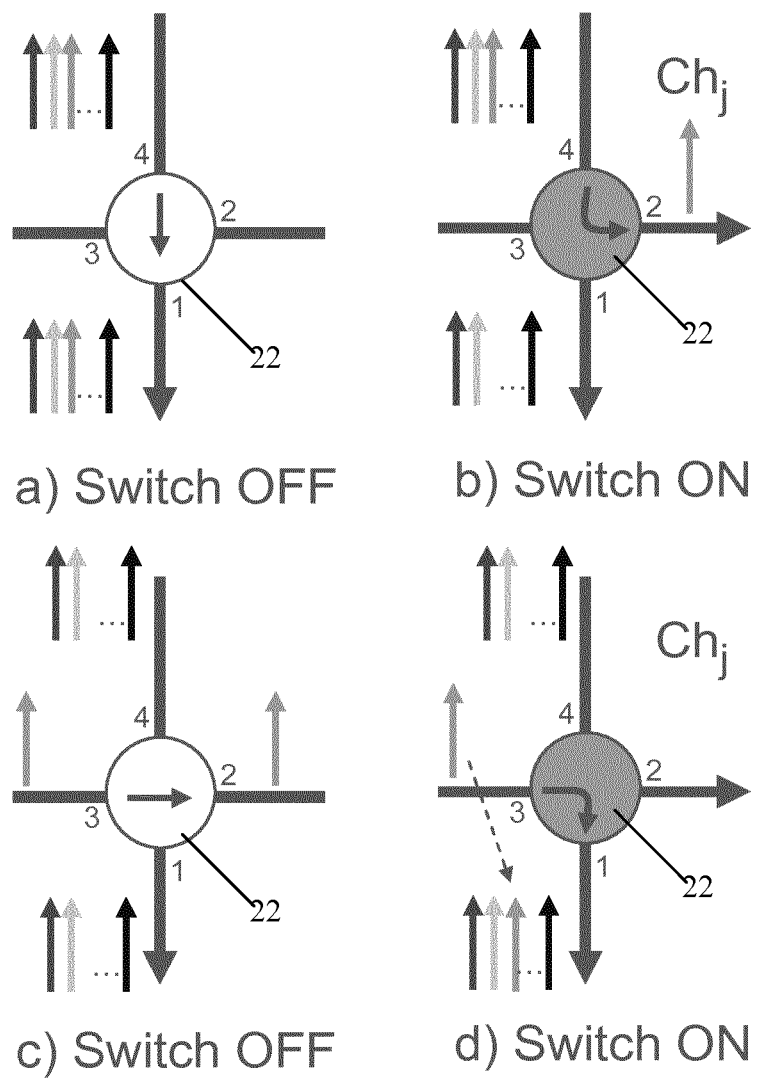
FIG. 3 shows a switch of the apparatus of FIG. 1, a) in the OFF state routing optical signals from port 4 to port 1, b) in the ON state routing an optical signal at a selected wavelength from port 4 to port 2, c) in the OFF state routing an optical signal at a selected wavelength from port 3 to port 2, and d) in the OFF state routing an optical signal at a selected wavelength from port 3 to port 1.
Figure 4:
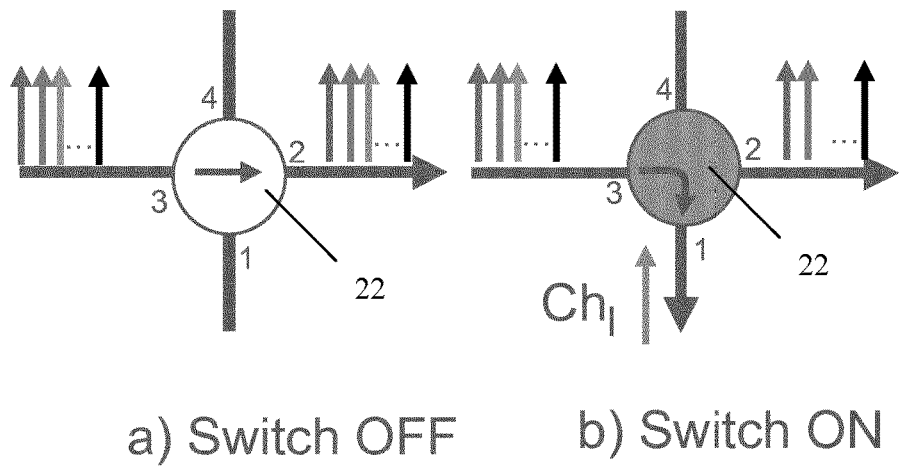
FIG. 4 shows a switch of the apparatus of FIG. 1 a) in the OFF state routing all signals from port 3 to port 2, and b) in the ON state routing an optical signal at a selected wavelength from port 3 to port 1.
Figure 5:
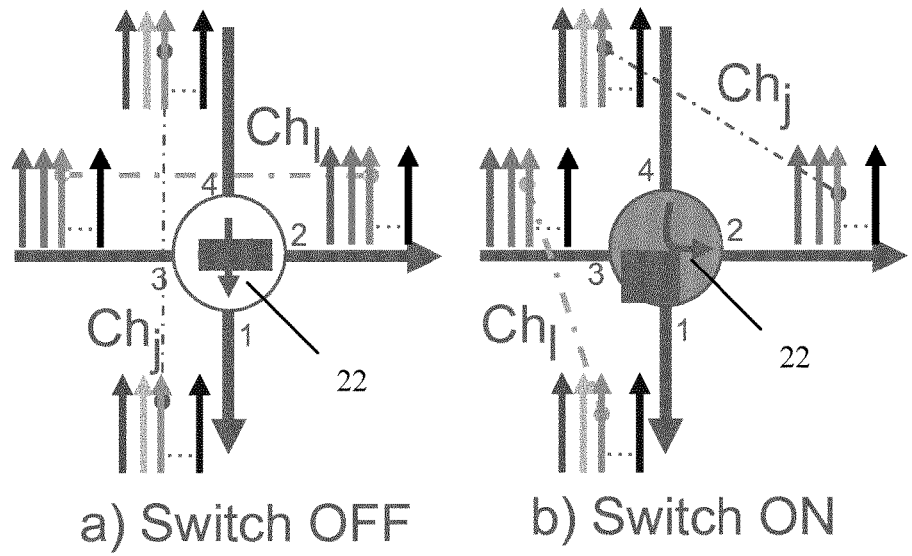
FIG. 5 shows a switch of the apparatus of FIG. 1, a) in the OFF state routing optical signals at a first plurality of optical signals from port 4 to port 1 and routing a second plurality of signals from port 3 to port 2, and b) in the ON state switching two optical signals, one from each set, at a selected wavelength from port 3 to port 1 and from port 4 to port 2 respectively.

Referring to FIGS. 1 to 5, a first embodiment of the invention provides reconfigurable optical switch apparatus 10 comprising m input ports 12, m output ports 14, k add ports 16, k drop ports 18, and a switch matrix 20.

Each input port 12 is arranged to receive an optical signal having a respective one of y wavelengths. Each output port 14 is arranged to output an optical signal having a respective one of the y wavelengths. Each add port 16 is arranged to receive an optical signal to be added at one of the y wavelengths. Each drop port 18 is arranged to output an optical signal to be dropped at one of the y wavelengths.

Each of m, k and y is an integer which is at least 2.

The switch matrix 20 comprises m×k wavelength selective optical switches 22. The optical switches are arranged in m rows 24, each connected between a respective input port and a respective output port, and k columns 26, each connected at one end to a respective drop port and at an opposite end to a respective add port.

Each wavelength selective optical switch 22 comprises four ports: a first port and a fourth port arranged in a respective one of the columns 26; and a second port and a third port arranged along a respective one of the rows 24. Each switch has an OFF state, in which each optical signal having one of the y wavelengths received at the third port is output at the second port, as illustrated in FIGS. 3c, 4a and 5a, and each optical signal having one of the y wavelengths received at the fourth port is output at the first port, as illustrated in FIGS. 3a and 5a.

Each switch also has an ON state in which an optical signal having a preselected one of the y wavelengths received at the third port is output at the first port, as illustrated in FIGS. 3d, 4b and 5b. An optical signal having the same preselected wavelength received at the fourth port is output at the second port, as illustrated in FIGS. 3b and 5b. In the ON state each optical signal received which does not have the preselected wavelength is routed in the same manner as in the OFF state, that is to say from the third port to the second port or from the fourth port to the first port.

The columns 26 of the switch matrix are grouped in adjacent pairs 28. In each pair a first column 26a is connected to a respective drop port on a first side of the switch matrix (the bottom of the switch matrix as orientated in the Figures). Each wavelength selective switch in each first column has its fourth port arranged on the first side. This enables an optical signal to be routed downwards, towards the drop port. In each pair, a second column 26b, adjacent the first column, is connected to a respective drop port on a second side, opposite the first side, of the switch matrix (at the top of the switch matrix as orientated in the Figures). Each wavelength selective switch in each second column has its fourth port arranged on the second side. This enables an optical signal to be routed upwards, towards the drop port. In each pair therefore the optical switches of the first column 26a and the optical switches of the second column 26b have their first and fourth ports oppositely orientated.

The second and third ports of the optical switches 22 may be arranged to enable an optical signal to traverse the switch matrix 20 in the direction left to right (as orientated in FIG. 2) or from right to left.

Figure 6:
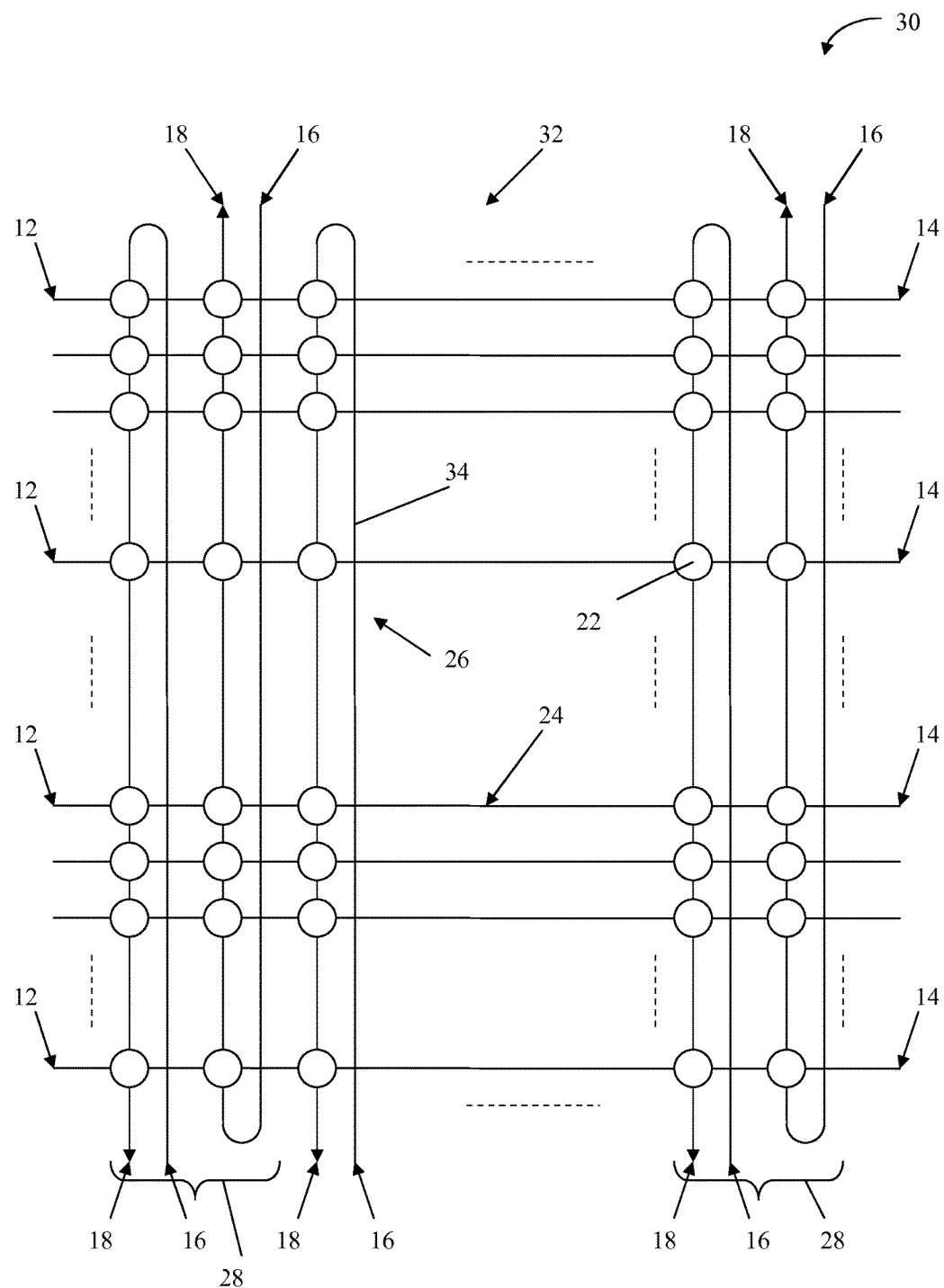
FIG. 6 is a schematic representation of reconfigurable optical switch apparatus according to a second embodiment of the invention.

Referring to FIG. 6, a second embodiment of the invention provides reconfigurable optical switch apparatus 30 which is similar to the reconfigurable optical switch apparatus of FIGS. 1 to 5, with the following modifications. The same reference numbers are retained for corresponding features.

In this embodiment, the add port 16 and the drop port 18 of each column 26 are located on the same side of the switch matrix 32. In each said pair of columns 28 the add port 16 and the drop port 18 of the first column are located on the first side of the switch matrix and the add port and the drop port of the second column are located on the second side of the switch matrix.

An optical waveguide 34 is provided for each column 26, which connects the add port 16 to the opposite end of the column. The waveguide 34 extends from the add port to the opposite end of the column where it bends and is connected to the column of optical switches. This enables the reconfigurable optical switch apparatus 30 to support a minimum number, k, of transceivers, since a single transceiver may be connected to the add port and drop port of each column.

This arrangement of the columns 26 and waveguides 34 enables the reconfigurable optical switch apparatus 30 to be implemented as a photonic integrated circuit on a silicon based chip. This arrangement of the columns 26 and waveguides 34 in a photonic integrated circuit enables the electromagnetic fields of the optical signals to be confined as much as possible in order to minimize leakage and propagation losses in the switch matrix.

In a third embodiment of the invention the reconfigurable optical switch apparatus, which may be as shown in FIG. 1 or 6, k is greater than y. That is to say, the number of add ports is greater than the number of wavelengths and the number of drop ports is greater than the number of wavelengths. The switch matrix is therefore able to achieve reconfigurable non-blocking operation.

In a fourth embodiment of the invention the reconfigurable optical switch apparatus, which may be as shown in FIG. 1 or 6, k is at least 2y. That is to say, the number of add ports is greater than or equal to twice the number of wavelengths and the number of drop ports is greater than or equal to twice the number of wavelengths. The switch matrix is therefore able to achieve strictly non-blocking operation, having sufficient alternative paths for each optical signal to ensure that collision of optical signals of the same wavelength is always avoided.

Figure 7:
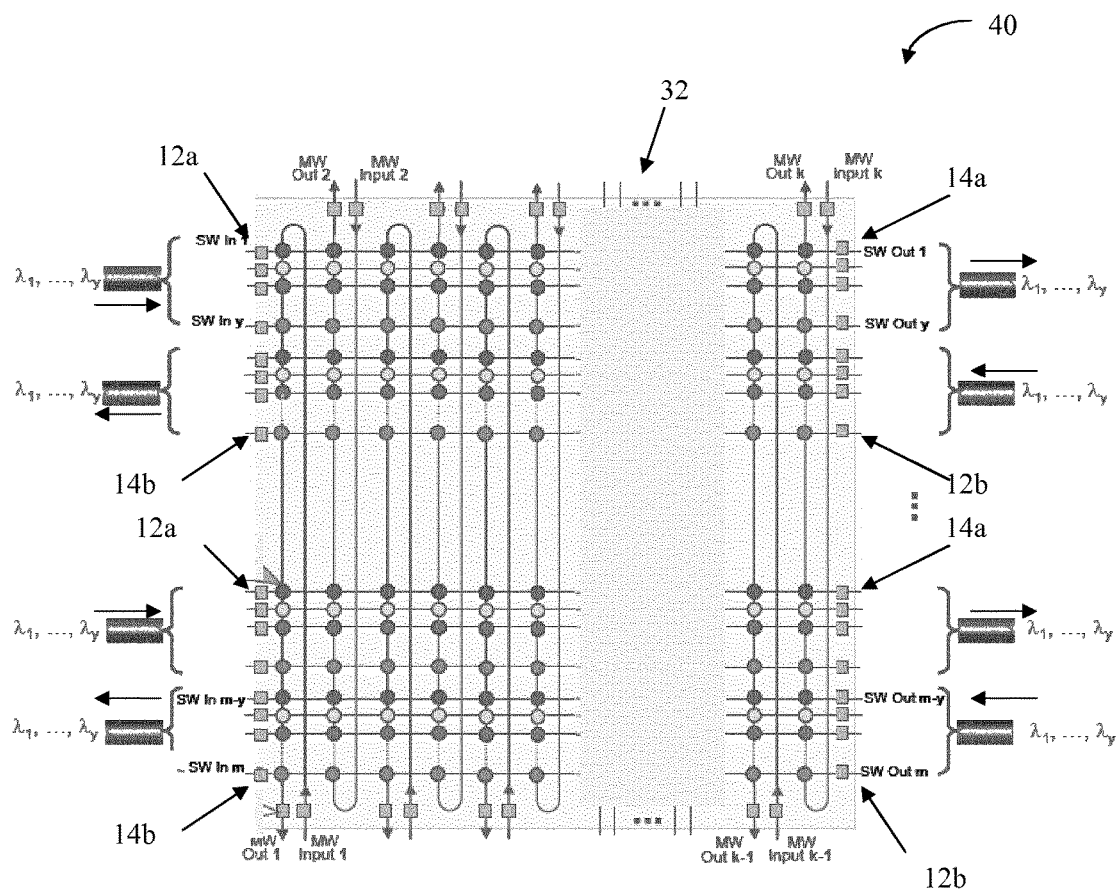
FIG. 7 is a schematic representation of reconfigurable optical switch apparatus according to a fifth embodiment of the invention.
Figure 8:
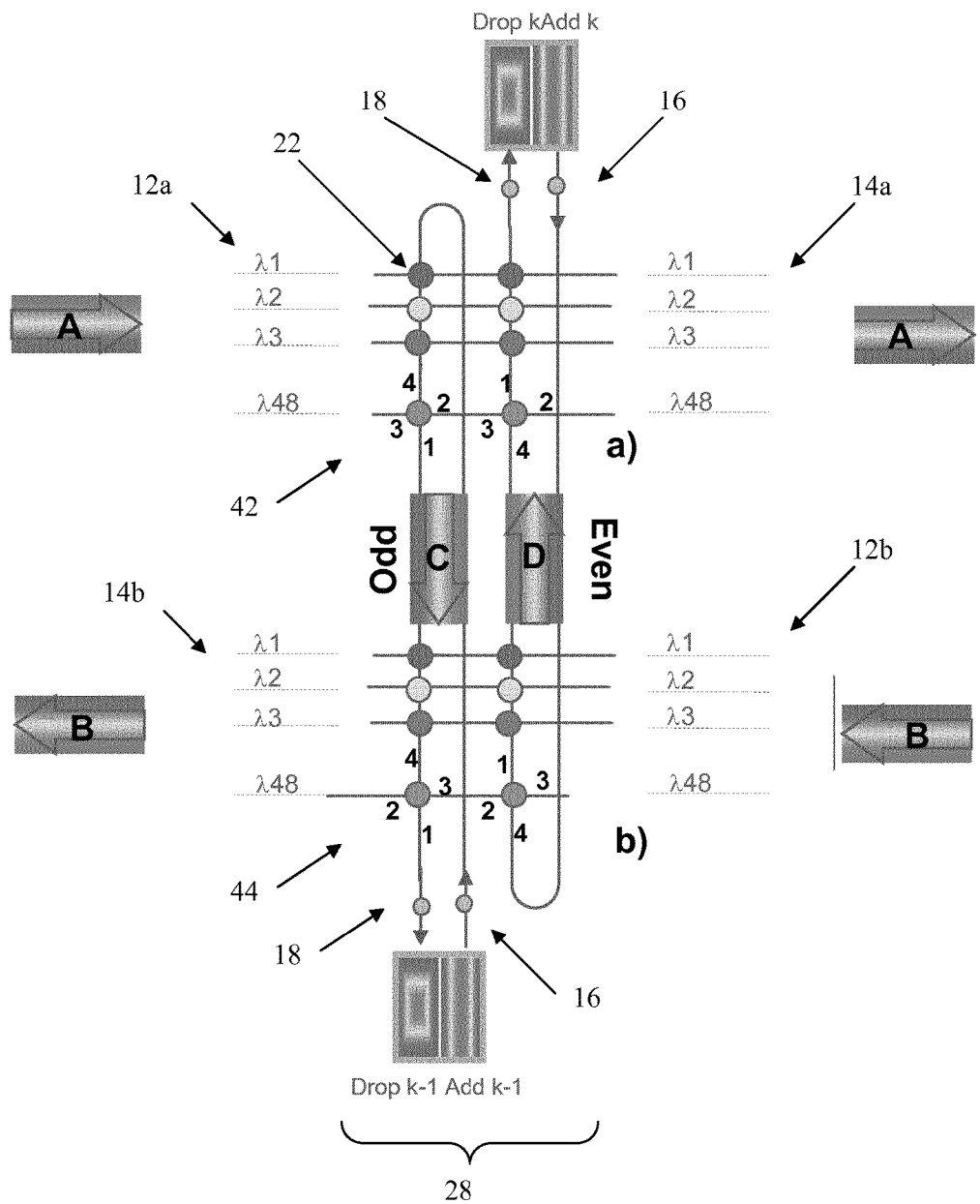
FIG. 8 shows a pair of columns of the switch matrix of the apparatus of FIG. 7.

Referring to FIGS. 7 and 8, a fifth embodiment of the invention provides reconfigurable optical switch apparatus 40 which is similar to the reconfigurable optical switch apparatus of FIG. 6, with the following modifications. The same reference numbers are retained for corresponding features.

In this embodiment, a first set of the input ports 12a are on a third side of the switch matrix (the left side as shown in the Figure) and a second set of the input ports 12b are on a fourth side of the switch matrix (the right side as shown in the Figure). The input ports on each side are arranged into sub-groups of y input ports, each input port being arranged to receive a different one of the y wavelengths.

A corresponding first set of the output ports 14a are on the fourth side of the switch matrix and a corresponding second set of the output ports 14b are on the third side of the switch matrix. The output ports on each side are arranged into sub-groups of y output ports, each output port being arranged to output a different one of the y wavelengths.

A first plurality of the wavelength selective optical switches 42 of each column have their third and second ports arranged to route an optical signal in a direction from the third side to the fourth side of the switch matrix (left to right, in the direction of the arrows A, in the Figure).

A second plurality of the wavelength selective optical switches 44 in each column have their third and second ports arranged to route an optical signal in a direction from the fourth side to the third side of the switch matrix (right to left, in the direction of the arrows B, in the Figure).

Figure 9:
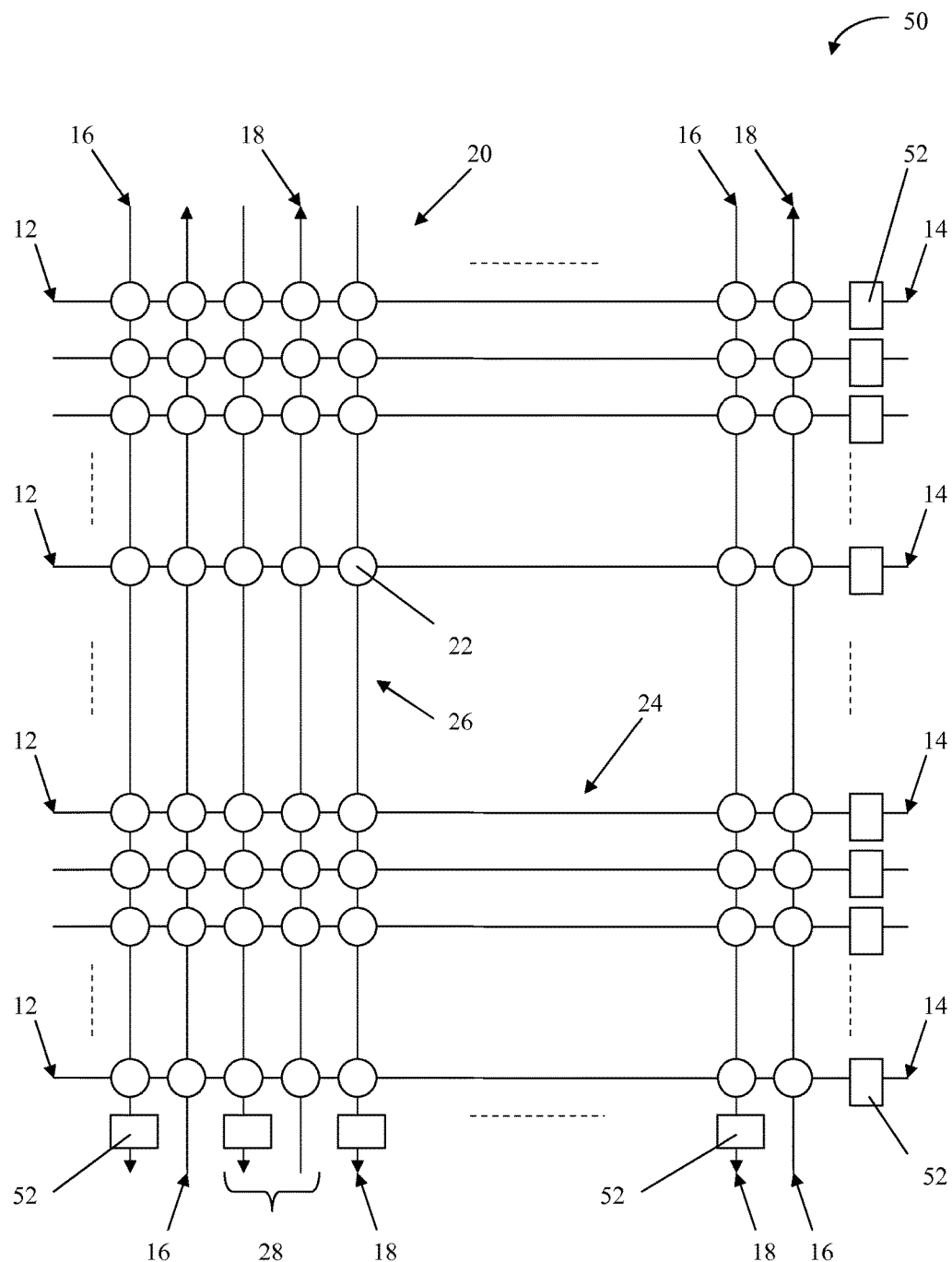
FIG. 9 is a schematic representation of reconfigurable optical switch apparatus according to a sixth embodiment of the invention.

A sixth embodiment of the invention provides reconfigurable optical switch apparatus 50 as shown in FIG. 9. The apparatus 50 of this embodiment is similar to the reconfigurable optical switch apparatus of FIG. 1, with the following modifications. The same reference numbers are retained for corresponding features.

In this embodiment, optical signal monitoring apparatus 52 is provided at each output port 14 and at each drop port 18. The optical signal monitoring apparatus is configured to detect the presence of an optical signal at the respective port and is configured to generate an alarm signal if the presence of an optical signal intended to be output at that port is not detected.

Optical signal monitoring apparatus 52 may also be provided at each input port and each add port.

Figure 10:
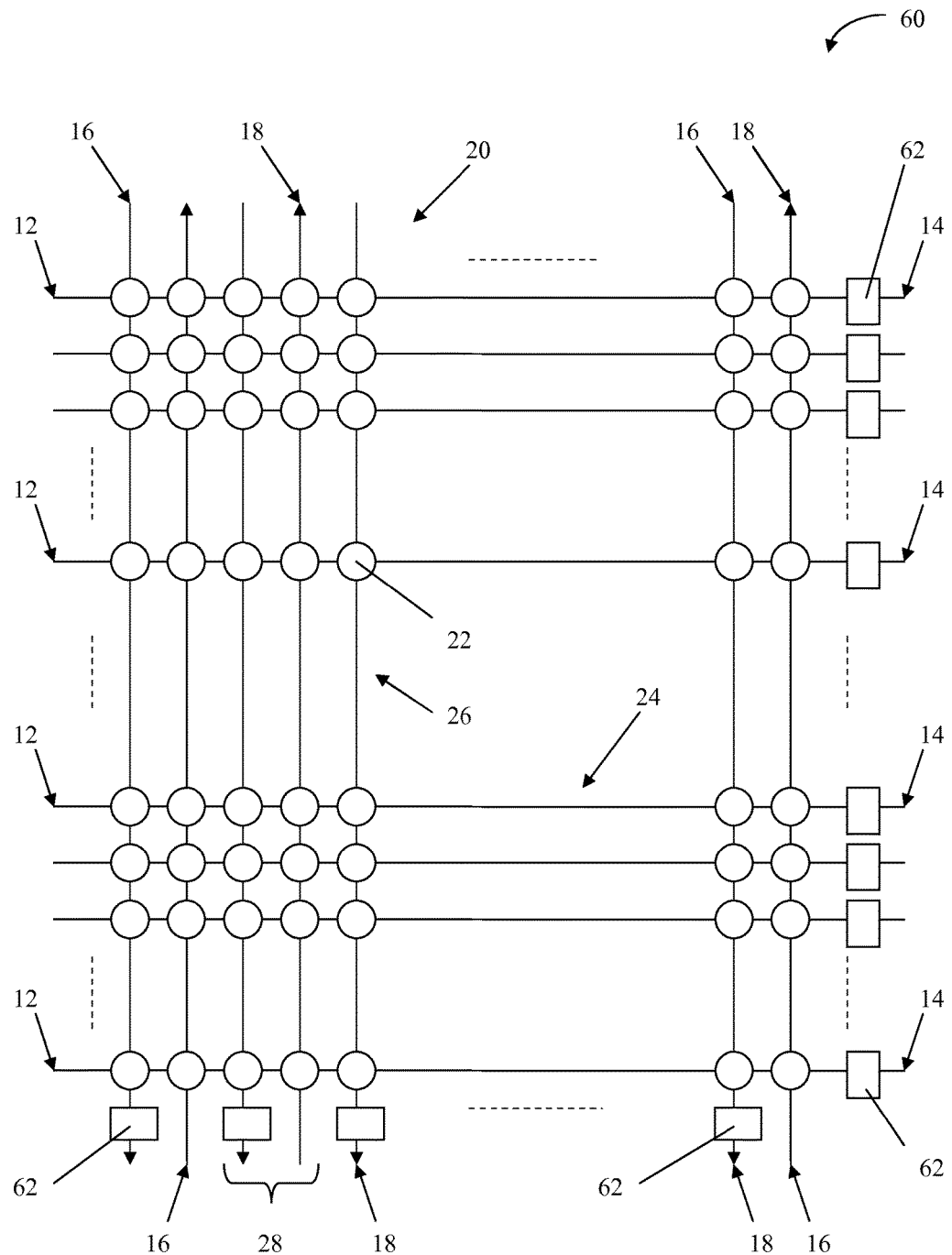
FIG. 10 is a schematic representation of reconfigurable optical switch apparatus according to a seventh embodiment of the invention.

A seventh embodiment of the invention provides reconfigurable optical switch apparatus 60 as shown in FIG. 10. The apparatus 60 of this embodiment is similar to the reconfigurable optical switch apparatus of FIG. 1, with the following modifications. The same reference numbers are retained for corresponding features.

In this embodiment, optical signal power equalisation apparatus 62 is provided at each output port 14 and at each drop port 18. Each optical path across the switch matrix 20 will introduce a respective optical loss to an optical signal propagating through it. The optical signal power equalisation apparatus 62 may enable different optical losses experienced by optical signals propagating through different optical paths to be compensated for optical signal power equalisation apparatus 62 may also be provided at each input port and at each add port.

It will be appreciated that the features of the sixth and seventh embodiment may be combined, so that optical signal monitoring apparatus 52 and optical signal power equalisation apparatus 62 are provided at each output port 14 and each drop port 18.

Figure 11:
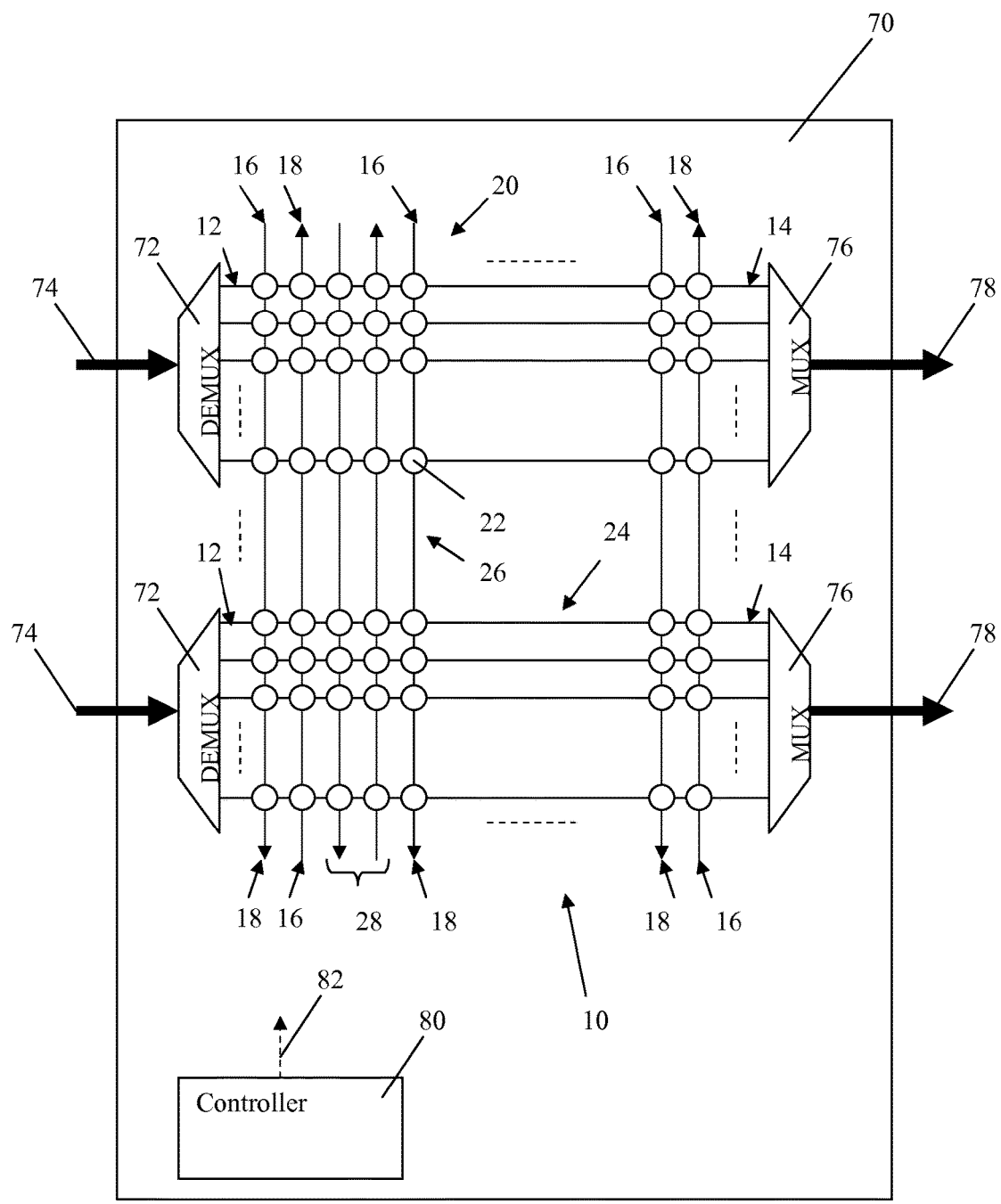
FIG. 11 is a schematic representation of reconfigurable optical add drop multiplexer according to an eighth embodiment of the invention.
Figure 12:
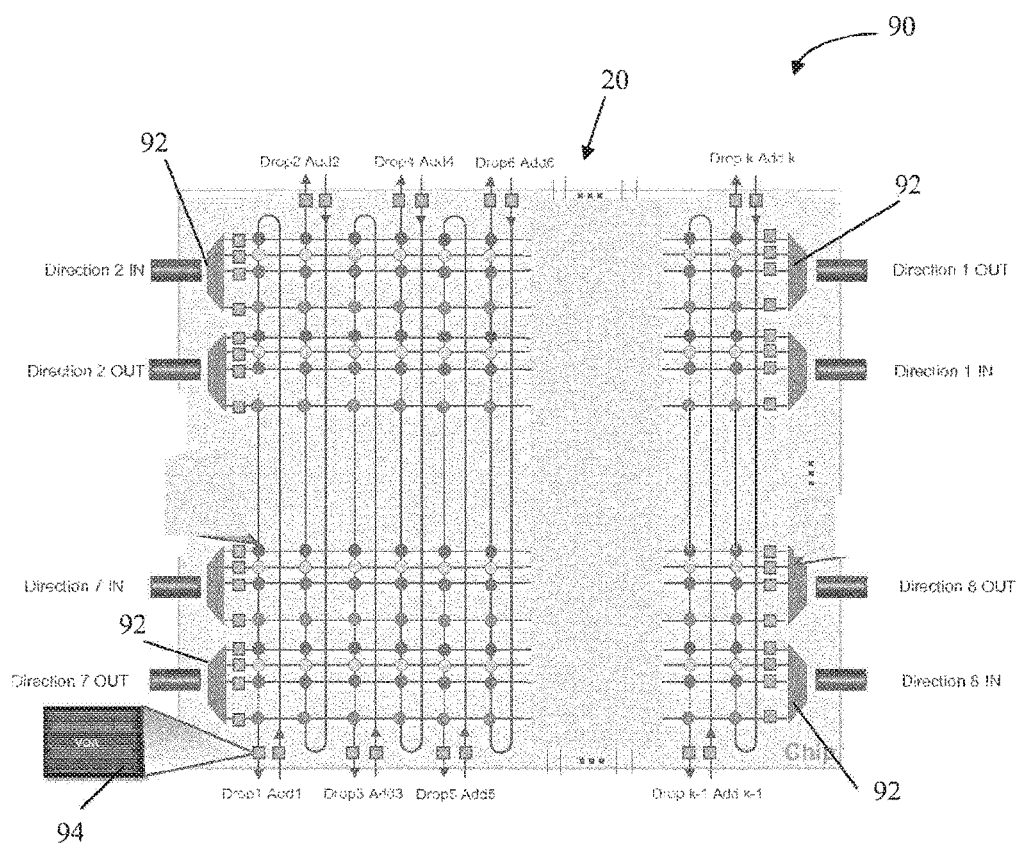
FIG. 12 is a schematic representation of reconfigurable optical add drop multiplexer, ROADM, according to a ninth embodiment of the invention.

An eighth embodiment of the invention provides a reconfigurable optical add drop multiplexer, ROADM, 70 as shown in FIG. 11. The ROADM comprises a plurality of optical signal demultiplexers 72, reconfigurable optical switch apparatus 10 as shown in FIG. 1, a plurality of optical signal multiplexers 76 and a controller The optical signal demultiplexers 72 are each arranged to receive an input wavelength division multiplexed optical signal 74. Each demultiplexer 72 is arranged to demultiplex the respective input optical signal into a plurality of optical signals each having a different one of y wavelengths.

The optical signal multiplexers 76 are each arranged to receive a plurality of optical signals, one from each of a plurality of the output ports. Each multiplexer 76 is arranged to multiplex the received optical signals into an output wavelength division multiplexed optical signal 78.

The controller 80 is configured to generate a switch control signal 82 arranged to cause a wavelength selective optical switch to change between the OFF state and the ON state.

Each add port 16 and each drop port 18 is arranged to be connected to a respective transceiver.

It will be appreciated that any of the reconfigurable optical switch apparatus 30, 40, 50, 60 of FIGS. 6 to 10 may alternatively be used in the ROADM 70.

A ninth embodiment of the invention provides a reconfigurable optical add drop multiplexer, ROADM, 90 as shown in FIGS. 12 to 16. The ROADM 90 of this embodiment is similar to the ROADM 70 of FIG. 11 with the following modifications. The same reference numbers are retained for corresponding features.

In this embodiment, the ROADM 90 comprises a reconfigurable optical switch as shown in FIG. 7, with the following modifications. In this embodiment, each wavelength selective optical switch is a microring resonator based electro-optic switch, arranged to resonate on a single wavelength of the ITU-T spectral grid for WDM applications as defined in ITU-T Recommendation G.964.1, with up to 40 GHz effective optical bandwidth.

It will be appreciated that the wavelength selective optical switches may alternatively be Mach-Zehnder interferometer based electro-optic switches, such as the cascaded Mach-Zehnder interferometers combined with narrow optical filters for single or multiple wavelength selection, as reported by S. Nakamura et all, "Wavelength selective switching with one-chip silicon photonic circuit including 8×8 matrix switch", Optical Fiber Communication Conference 2011, paper OTuM2.

These wavelength selective optical switches have fast switching times, small insertion loss (lower than 0.5 dB when operative) and a small footprint of a few micrometers.

The multiplexers and demultiplexers in this embodiment each comprise an arrayed waveguide grating, AWG, 92. Each sub-set of y input ports is coupled to an AWG arranged as a demultiplexer and each sub-set of y output ports is coupled to an AWG arranged as a multiplexer. The bandwidth and channel spacing of the AWGs depends on the minimum multiplexing granularity of the optical system with which the ROADM 90 is to be used, for example 50 GHz channel spacing in a dense WDM, DWDM, optical communication system.

Each AWG 92 is connected to one of a plurality of ROADM directions. In this example there are eight directions, each having an input, IN, and an output, OUT. Considering for example the AWG demultiplexer 92 at direction 1 IN, a wavelength division multiplexed, WDM, optical signal having up to y optical signals each of a different one of y wavelengths may be received and demultiplexed, and each of the resulting y optical signals delivered to a respective one of the y input ports of the sub-group connected to the direction 1 IN AWG. Considering for example the AWG multiplexer 92 at direction 1 OUT, up to y optical signals each having a different one of y wavelengths may be received at the AWG multiplexer 92 from the sub-group of y output ports connected to it and multiplexed into a WDM output signal.

The number of de/multiplexed optical signals corresponds to the number of wavelengths carried by an optical fibre connected to a ROADM direction. Based on the number of possible wavelengths, y, the number of wavelength selective optical switches in each column of the switch matrix is established. The switch matrix of the ROADM 90 has m/y=8 different directions with two optical fibre links connected to each ROADM direction, that is 2m/y=16 in this example, each carrying up to y, 48 in this example, optical signals each of a different of the y wavelengths.

The ROADM 90 additionally comprises optical signal power equalisation apparatus, in the form of a variable optical attenuator, VOA, 94 at each input port, each output port, each add port and each drop port.

The m input ports directly connected with m output ports are mainly devoted to bypass optical signals from any direction toward any direction. The k input and k output ports are devoted to add and drop operations and can carry one or more of the y wavelengths. For this reason, no multiplexers or de-multiplexers are provided at the add ports and drop ports because each add port and drop port can be directly connected to a respective transceiver.

The ROADM 90 further comprises k transceivers, one for each pair of columns, to which the respective add port 16 and drop port 18 are connected. The transceivers are arranged to transmit and/or receive on a single wavelength, selected from the y wavelengths, and the operating wavelength of each transceiver may be tuned. In this example, only one wavelength at a time per added and dropped optical signal will be present at each of the drop ports and add ports.

Each transceiver can be arranged to add an optical signal at a different wavelength with respect to the wavelength of an optical signal received through its drop port. In such a way if an optical signal is dropped from one ROADM direction at a certain wavelength towards a selected drop port, a new channel at a different available wavelength can be added by the same transceiver in the same or in a different direction. This enables exploitation of all available connections in an optical communication network incorporating the ROADM and enables multicast operations to be implemented.

ROADM can be formed on a single silicon based chip, including AWG and integrated waveguides, or on a few separate chips.

Figure 13:
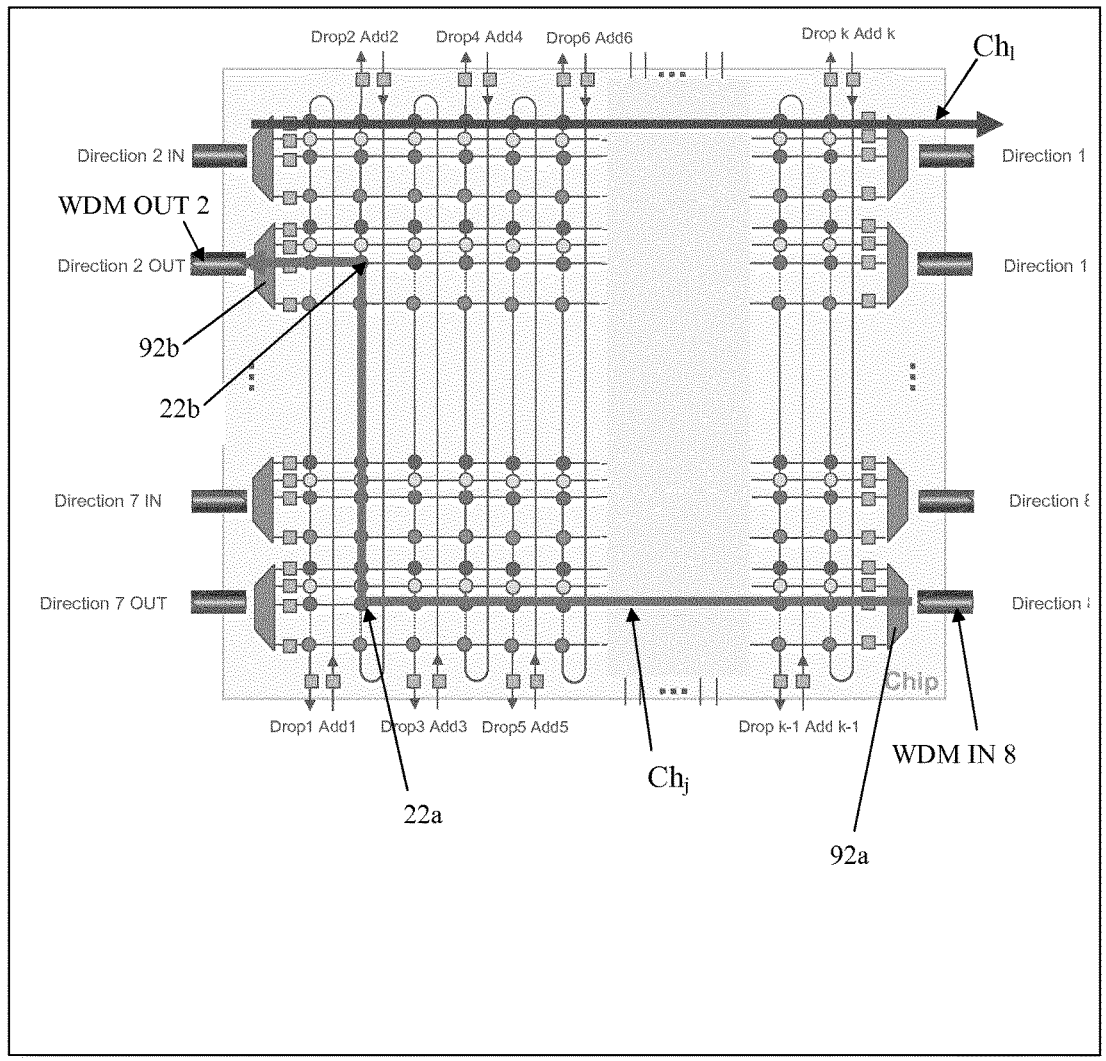
FIG. 13 shows two paths for pass-through traffic, from direction 2 to direction 1 and from direction 8 to direction 2, through the ROADM of FIG. 12.
Figure 14:
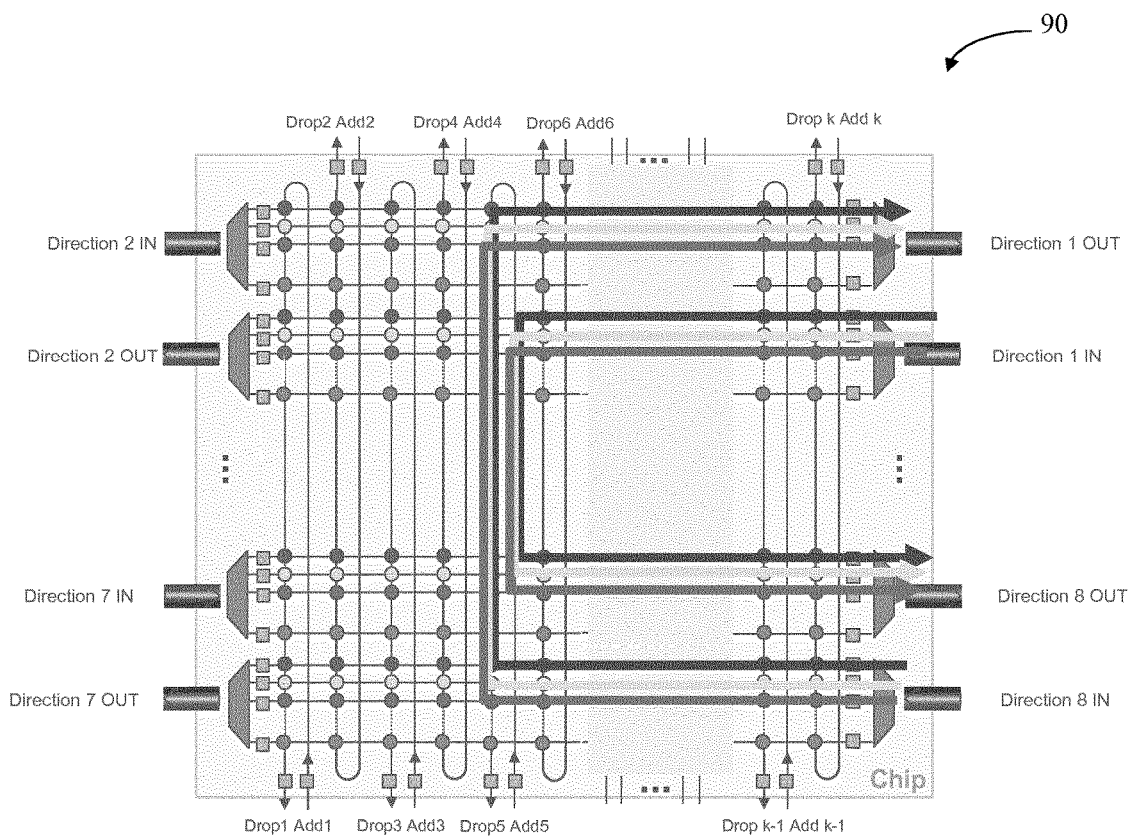
FIG. 14 shows three paths for pass-through traffic from direction 1 to direction 8 and three paths from direction 8 to direction 1 through the ROADM of FIG. 12.

Referring to FIG. 13, by-pass optical signals can be routed from any direction to any direction and on any available wavelength ensuring full connectivity across the ROADM 90 as follows.

For example, to configure a path for optical signal Chj, transmitted on wavelength λj, to be routed from direction 8 to direction 2 the AWG 92a connected to Direction 8 IN de-multiplexes the incoming WDM optical signal, WDM IN 8. The optical signal, $Ch_j$, propagates alone along the row of the switch matrix 20 directly connected with the $j^{th}$ input port of the AWG 92a. A first optical switch 22a located in an even column, in this example the column connected to drop port 2, where no optical signal having wavelength $\lambda_j$ is propagating is set to the ON state. The optical signal, $Ch_j$, is received at port 3 of the first optical switch 22a and output at port 1 of the optical switch. The optical signal, $Ch_j$, then propagates up the even column to a second optical switch 22b, located in the row connected with the $j^{th}$ output port of the AWG 92b connected to Direction 2 OUT. The second optical switch is set to the ON state and $Ch_j$ is received at port 4 and output at port 2. The optical signal, $Ch_j$, propagates alone along the row to the AWG 92b. The AWG 92b delivers the optical signal as part of a WDM output signal, WDM OUT 2, to the optical fibre link connected to ROADM direction 2 OUT.

The bypass optical signal, $Ch_j$, is therefore routed across the ROADM 90 using only two optical switches.

As a further example, if an optical signal, $Ch_1$, is to be bypassed from Direction 2 IN to direction 1 OUT in the ROADM 90 no optical switches are required to be set to the ON state and the optical signal, $Ch_1$, propagates across the switch matrix 20 on the shortest optical path, experiencing the lowest optical attenuation.

Figure 15:
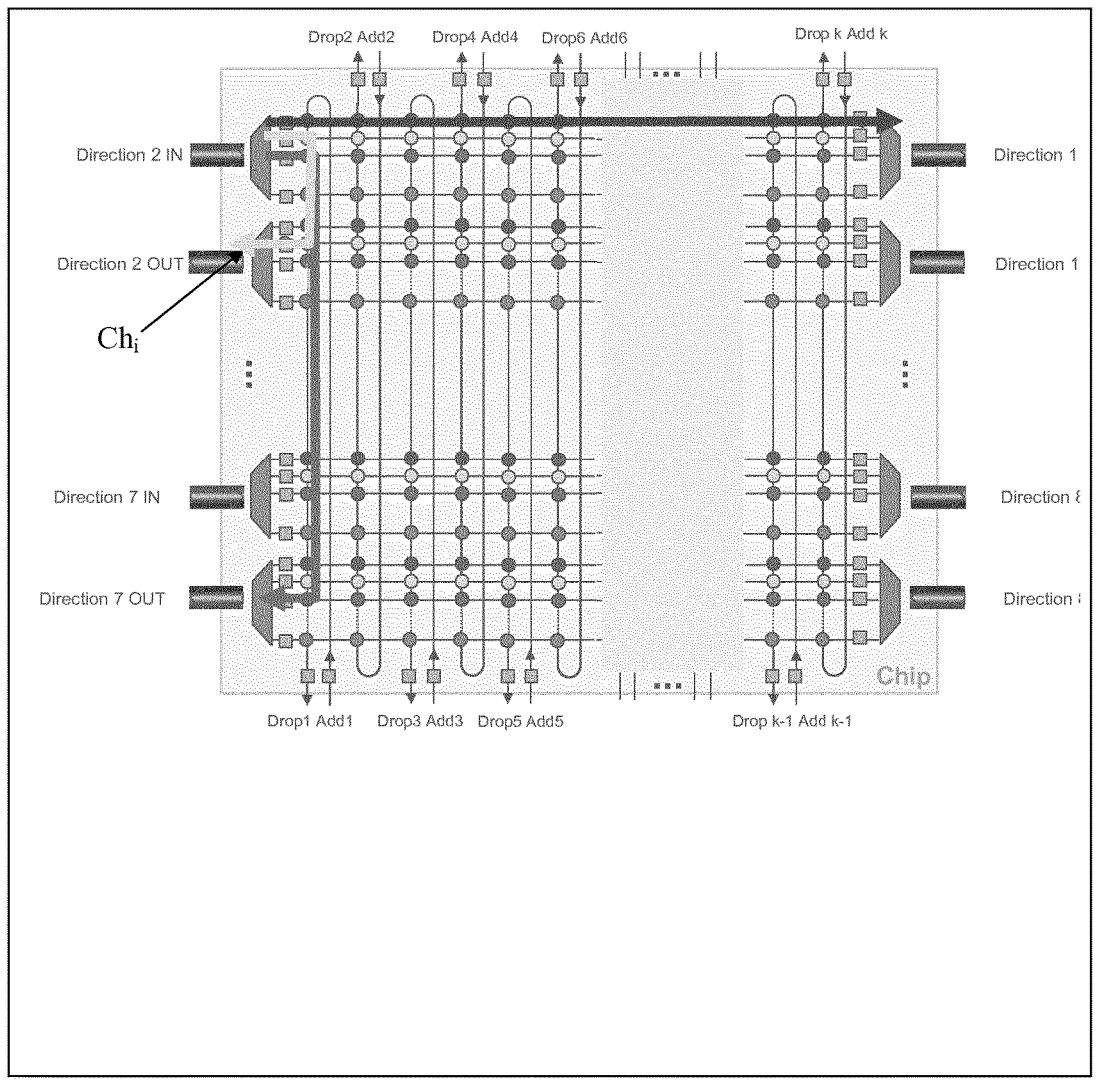
FIG. 15 shows three paths for pass-through traffic, from direction 2 to direction 1, from direction 2 to direction 7, and in and out at direction 2, through the ROADM of FIG. 12.

Referring to FIG. 15, fault recovery and path restoration configurations can be implemented in the ROADM 90 due to the number of columns and the requirement of no more than two optical switches to be operated to set up a path. If an optical signal, $Ch_j$, must be transmitted back where it came from, two optical switches are set to the ON state and optical signal can be routed from Direction 2 IN to Direction 2 OUT.

When routing by-pass optical signals only those columns not already in use with another optical signal at the same wavelength can be used in the switch matrix 20. This condition can always be met if the number k of add ports and drop ports is higher than the number of ROADM directions and if each transceiver can transmit and receive at only one (tuned) wavelength for each add and drop operation. This may be met for example where k is between 24 and 96 and the ROADM has 8 directions, when the number of wavelengths, y≤96.

Given the above, the ROADM 90 can perform routing of bypass traffic from and to any direction and on any available wavelength ensuring full connectivity.

Add and drop operations can be performed simultaneously using a single wavelength selective optical switch 22. Each transceiver can add and drop optical signals at only one wavelength at a time. A column in which an add and drop operation is being performed at a selected wavelength cannot be used to route a bypass optical signal at the same wavelength, another available column must be used. It is clearly expected in a ROADM that up to m/y add and drop operations towards m/y different transceivers and from m/y different directions can be carried out for each wavelength. Hence up to m/y different columns can be occupied to add and drop channels at the same wavelength but coming from different ROADM directions. Thus, there will always be available columns to route bypass optical signals from any direction to any direction.

Figure 16:
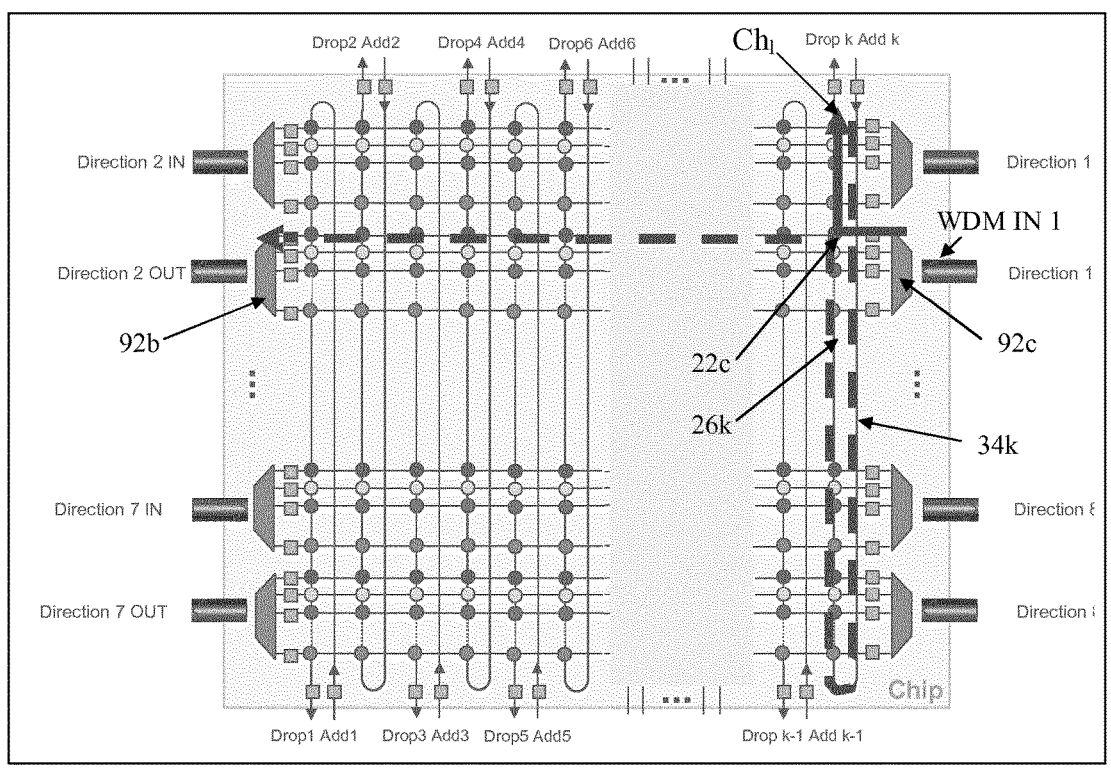
FIG. 16 shows simultaneously established paths from add port k to an output port at direction 2 and from an in port at direction 1 to drop port k, through the same optical switch.

Referring to FIG. 16, the switch matrix 20 can be configured to simultaneously drop a first optical signal, $Ch_1$, at wavelength $\lambda_j$ from Direction 1 IN to drop port k and add a second optical signal $Ch_{l+1}$, at the same wavelength to be output at Direction 2 OUT.

The AWG 92c connected to ROADM direction 1 IN receives and de-multiplexes an incoming WDM optical signal, WDM IN 1. The first optical signal, $Ch_1$, propagates alone on the row of the switch matrix 20 connected with the $l^{th}$ input port connected to the AWG 92c. A switch element 22c in the column connected to drop port k is set to the ON state to select and route λ1. The first optical signal, $Ch_1$, is received at port 3 and output at port 1 of the optical switch. The first optical signal, $Ch_1$, propagates up the selected even column to the drop port k, connected to transceiver k (not shown).

The second optical signal, $Ch_{l+1}$, at the same wavelength λ1 is added by transceiver k connected to add port k, in the same column. Transceiver k transmits the second optical signal, $Ch_{l+1}$, to add port k. The second optical signal propagates down the waveguide 34k, round the bend and into the column 26k connected to drop port k. The second optical signal propagates to the optical switch 22c resonating at λ1, which is located in the row connected to Direction 2 OUT. It is worth noting that there should be only one optical switch resonating at λ1 in column 26k. The optical switch 22c is already set to the ON state, to route the first optical signal, and the second optical signal, $Ch_{l+1}$, is received at port 4 and output at port 2. The second optical signal propagates alone along the row to the $l^{th}$ output port connected to the AWG 92b connected to ROADM direction 2 OUT.

The potential to operate add and drop operation by activating only one optical switch strongly reduces the number of optical switches which are required in the reconfigurable optical switch, consequently reducing optical losses, power consumption, cost and footprint.

Figure 17:
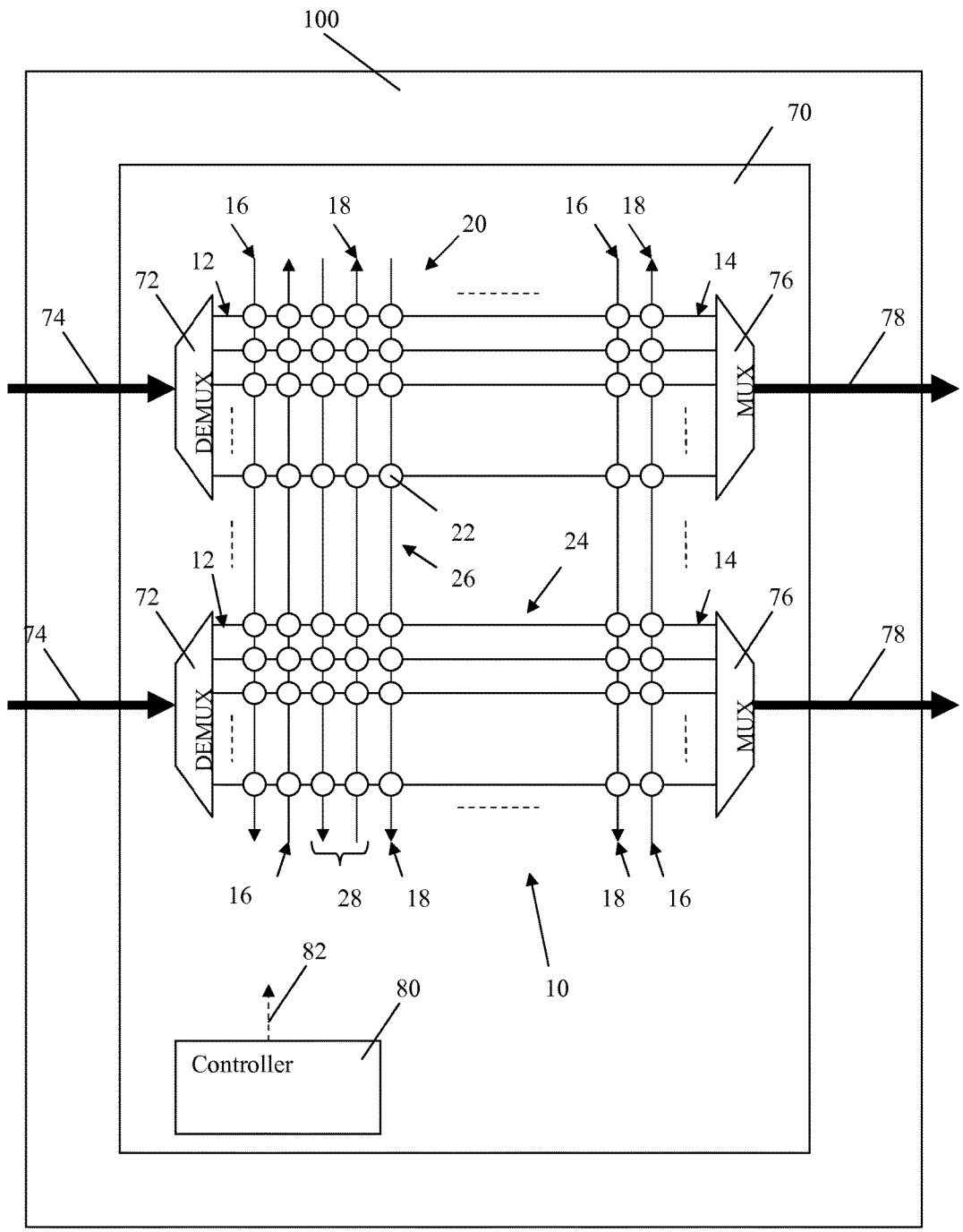
FIG. 17 is a schematic representation of an optical communication network according to a tenth embodiment of the invention.

A tenth embodiment of the invention provides an optical communication network element 100 as shown in FIG. 17. The network element 100 comprises a ROADM 70 as shown in FIG. 11.

It will be appreciated that the ROADM 90 of FIGS. 12 to 16 may alternatively be used.

Figure 18:
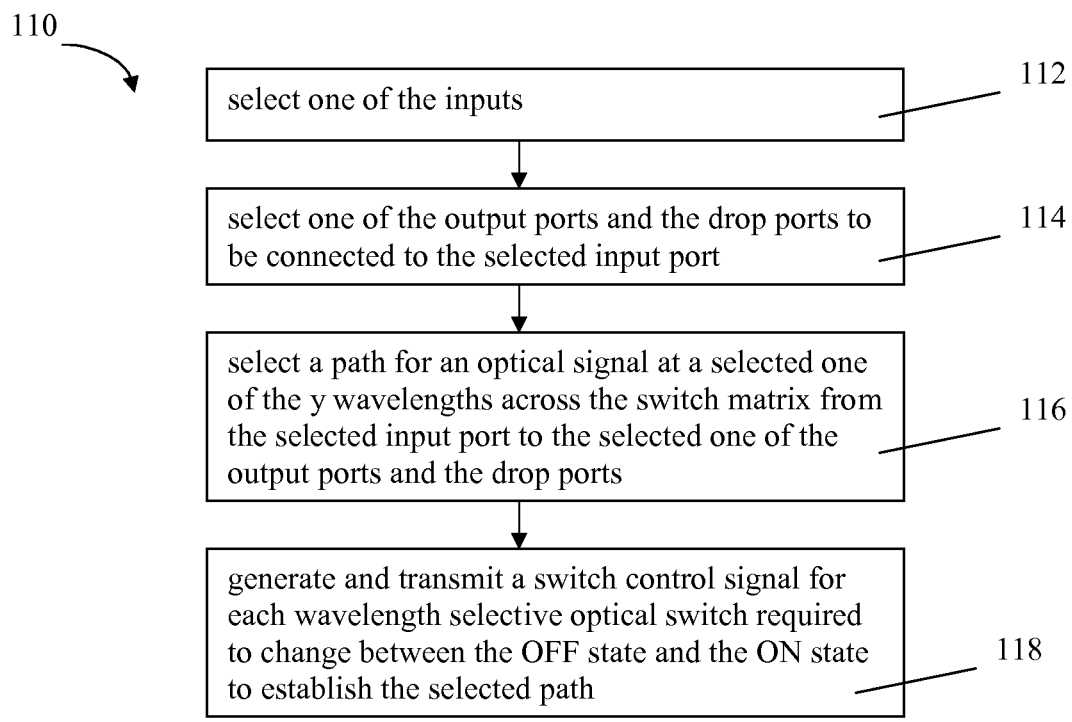
FIG. 18 shows the steps of a method according to an eleventh embodiment of the invention of controlling reconfigurable optical switch apparatus as shown in FIGS. 1 to 17.

An eleventh embodiment of the invention provides a method 110 of controlling reconfigurable optical switch apparatus as shown in any of FIGS. 1 to 17. The steps of the method 110 are shown in FIG. 18.

The method 110 comprises:
selecting one of the input ports 112;
selecting one of the output ports and the drop ports to be connected to the selected input port 114;
selecting a path for an optical signal at a selected one of the y wavelengths across the switch matrix from the selected input port to the selected one of the output ports and the drop ports 116; and generating and transmitting a switch control signal for each wavelength selective optical switch required to change between the OFF state and the ON state to establish the selected path 118.

Figure 19:
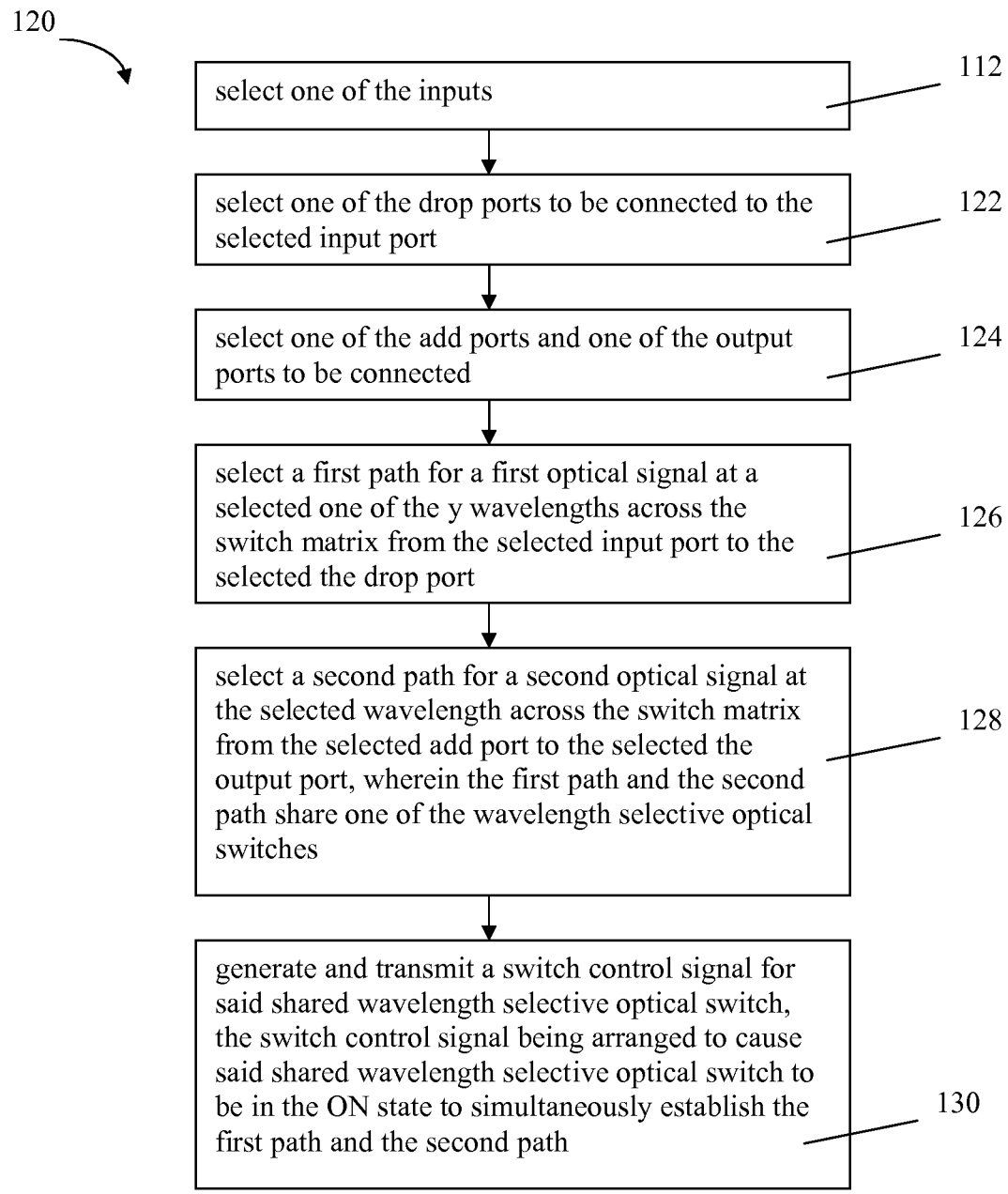
FIG. 19 shows the steps of a method according to a twelfth embodiment of the invention of controlling reconfigurable optical switch apparatus as shown in FIGS. 1 to 17.

A twelfth embodiment of the invention provides a method 120 of controlling reconfigurable optical switch apparatus as shown in any of FIGS. 1 to 17. The steps of the method 120 are shown in FIG. 19. The method 120 of this embodiment is similar to the method 110 shown in FIG. 18, with the following modifications. The same reference numbers are retained for corresponding steps.

In this embodiment, the method 120 comprises selecting one of the drop ports to be connected to the selected input port 122 and selecting one of the add ports and one of the output ports to be connected 124. The method 120 comprises selecting a first path for a first optical signal at a selected one of the y wavelengths across the switch matrix from the selected input port to the selected the drop port 126. The method 120 also comprises selecting a second path for a second optical signal at the selected wavelength across the switch matrix from the selected add port to the selected the output port 128. The first path and the second path share one of the wavelength selective optical switches.

The method 120 comprises generating and transmitting a switch control signal for the shared wavelength selective optical switch. The switch control signal is arranged to cause the shared wavelength selective optical switch to be in the ON state, to simultaneously establish the first path and the second path 130.

Figure 20:
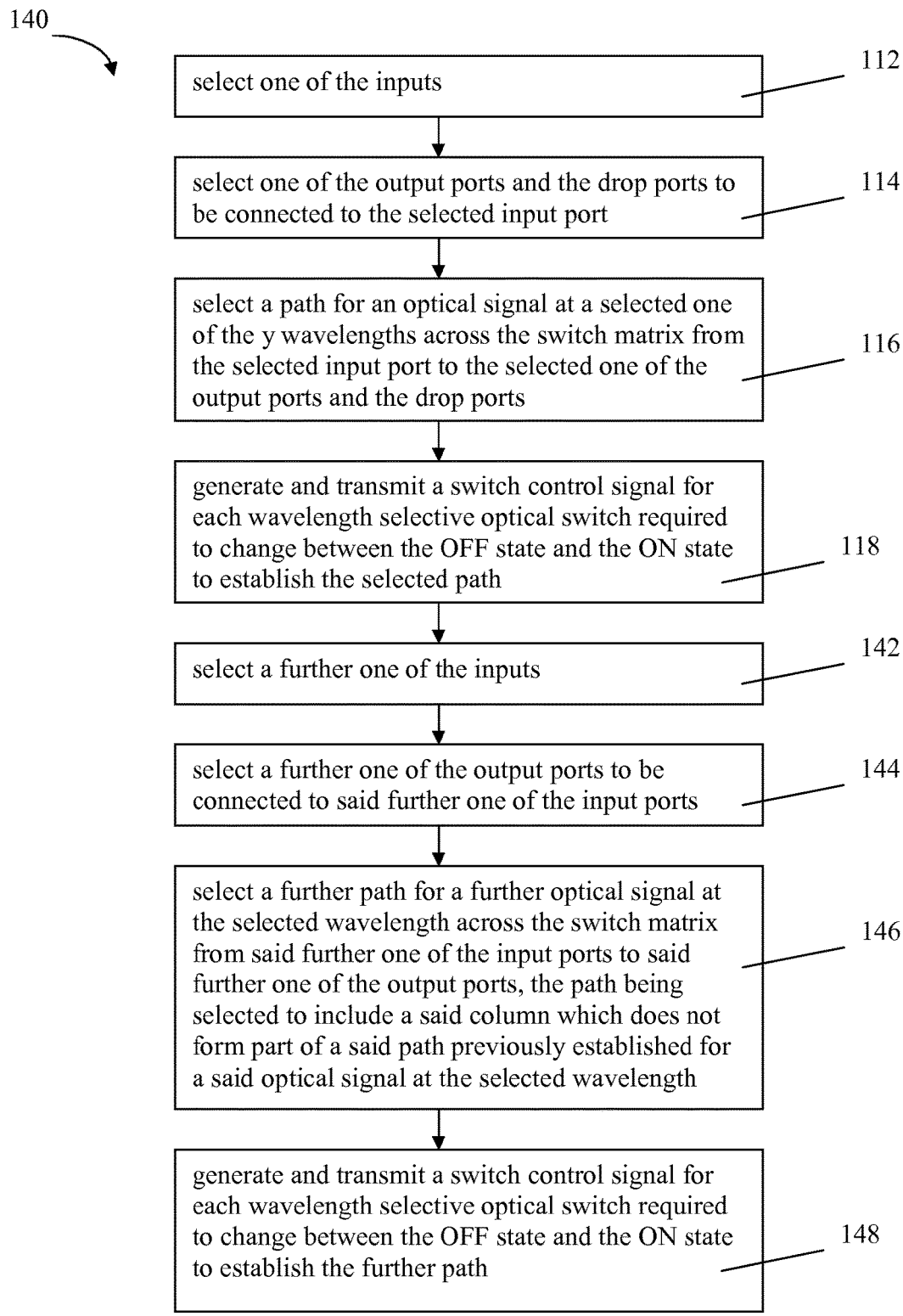
FIG. 20 shows the steps of a method according to a thirteenth embodiment of the invention of controlling reconfigurable optical switch apparatus as shown in FIGS. 1 to 17.

A thirteenth embodiment of the invention provides a method 140 of controlling reconfigurable optical switch apparatus as shown in any of FIGS. 1 to 17. The steps of the method 140 are shown in FIG. 20. The method 140 of this embodiment is similar to the method 110 shown in FIG. 18, with the following modifications. The same reference numbers are retained for corresponding steps.

In this embodiment, the method 140 comprises selecting a further one of the input ports 142 and selecting a further one of the output ports to be connected to the selected further one of the input ports 144. The method 140 comprises selecting a further path for a further optical signal at the selected wavelength across the switch matrix from the selected further one of the input ports to the selected further one of the output ports. The path is selected to include a column of the switch matrix which does not form part of a path previously established for an optical signal at the same selected wavelength 146.

The method 140 comprises generating and transmitting a switch control signal for each wavelength selective optical switch required to change between the OFF state and the ON state to establish the further path 148.

A fourteenth embodiment of the invention provides a data carrier having computer readable instructions embodied therein, the computer readable instructions being for providing access to resources available on a processor. The computer readable instructions comprise instructions to cause the processor to perform any of the steps of any of the methods 110, 120, 140 of controlling reconfigurable optical switch apparatus as shown in any of FIGS. 18 to 20.

The data carrier may be a non-transitory data carrier.

The invention claimed is:

1. A reconfigurable optical switch apparatus comprising:
   m input ports each arranged to receive an optical signal having a respective one of y wavelengths;
   m output ports each arranged to output an optical signal having a respective one of the y wavelengths;
   k add ports each arranged to receive an optical signal to be added at one of the y wavelengths;
   k drop ports each arranged to output an optical signal to be dropped at one of the y wavelengths; and
   a switch matrix comprising m×k wavelength selective optical switches arranged in m rows, each connected between a respective input port and a respective output port, and further arranged in k columns, each connected at one end to a respective drop port and at an opposite end to a respective add port,
   wherein each one of the wavelength selective optical switches comprises a first port and a fourth port arranged in a respective one of said columns and a second port and a third port arranged along a respective one of said rows, each one of the wavelength selective optical switches having an OFF state in which each optical signal having one of the y wavelengths received at the third port is output at the second port and each optical signal having one of the y wavelengths received at the fourth port is output at the first port and each one of the wavelength selective optical switches having an ON state in which an optical signal having a preselected wavelength of the y wavelengths received at the third port is output at the first port and an optical signal having said preselected wavelength received at the fourth port is output at the second port, and in which each optical signal received which does not have the preselected wavelength is routed in the same manner as in the OFF state;
   and wherein the columns are grouped in adjacent pairs, in each pair a first column being connected to a respective drop port on a first side of the switch matrix and each wavelength selective switch in said first column having the fourth port arranged on said first side and a second column, adjacent the first column, being connected to a respective drop port on a second side, opposite the first side, of the switch matrix and each one of the wavelength selective switches in said second column having the fourth port arranged on said second side, and wherein each of m, k and y is an integer which is at least 2.

2. The reconfigurable optical switch apparatus as claimed in claim 1, wherein the add port and the drop port of each one of the columns are located on the same side of the switch matrix and the switch matrix further comprises a respective optical waveguide for each one of the columns, the waveguide connecting the add port to the said opposite end of the column.

3. The reconfigurable optical switch apparatus as claimed in claim 2, wherein in each said pair of columns the add port and the drop port of the first column are located on the first side of the switch matrix and the add port and the drop port of the second column are located on the second side of the switch matrix.

4. The reconfigurable optical switch apparatus as claimed in claim 1, wherein k is greater than y.

5. The reconfigurable optical switch apparatus as claimed in claim 4, wherein k is at least 2y.

6. The reconfigurable optical switch apparatus as claimed in claim 1, wherein:
   a first set of the m input ports are on a third side of the switch matrix and a second set of the m input ports are on a fourth side of the switch matrix;
   a corresponding first set of the m output ports are on the fourth side of the switch matrix and a corresponding second set of the m output ports are on the third side of the switch matrix;
   a first plurality of the wavelength selective optical switches of each one of the columns have their third and second ports arranged to route an optical signal in a direction from the third side to the fourth side of the switch matrix; and
   a second plurality of the wavelength selective optical switches in each one of the columns have their third and second ports arranged to route an optical signal in a direction from the fourth side to the third side of the switch matrix.

7. The reconfigurable optical switch apparatus as claimed in claim 1, wherein the apparatus further comprises optical signal monitoring apparatus at each output port and each drop port, the optical signal monitoring apparatus being configured to detect the presence of an optical signal at a said port and being configured to generate an alarm signal if the presence of an optical signal intended to be output at a said port is not detected.

8. The reconfigurable optical switch apparatus as claimed in claim 1, wherein the apparatus further comprises optical signal power equalisation apparatus at each one of the output ports and at each one of the drop ports.

9. A reconfigurable optical add drop multiplexer comprising:
a plurality of optical signal demultiplexers each arranged to receive an input wavelength division multiplexed optical signal and arranged to demultiplex the input optical signal into a plurality of optical signals each having a different one of y wavelengths;
a reconfigurable optical switch apparatus comprising:
m input ports each arranged to receive a respective said optical signal,
m output ports each arranged to output an optical signal having a respective one of the y wavelengths,
k add ports each arranged to receive an optical signal to be added at one of the y wavelengths,
k drop ports each arranged to output an optical signal to be dropped at one of the y wavelengths,
a switch matrix comprising m×k wavelength selective optical switches arranged in m rows, each connected between a respective input port and a respective output port, and further arranged in k columns, each connected at one end to a respective drop port and at an opposite end to a respective add port,
wherein each one of the wavelength selective optical switches comprises a first port and a fourth port arranged in a respective one of said columns and a second port and a third port arranged along a respective one of said rows, each one of the wavelength selective optical switches having an OFF state in which each optical signal having one of the y wavelengths received at the third port is output at the second port and each optical signal having one of the y wavelengths received at the fourth port is output at the first port and each one of the wavelength selective optical switches having an ON state in which an optical signal having a preselected wavelength of the y wavelengths received at the third port is output at the first port and an optical signal having said preselected wavelength received at the fourth port is output at the second port, and in which each optical signal received which does not have the preselected wavelength is routed in the same manner as in the OFF state,
and wherein the columns are grouped in adjacent pairs, in each pair a first column being connected to a respective drop port on a first side of the switch matrix and each wavelength selective switch in said first column having the fourth port arranged on said first side and a second column, adjacent the first column, being connected to a respective drop port on a second side, opposite the first side, of the switch matrix and each one of the wavelength selective switch in said second column having the fourth port arranged on said second side, and wherein each of m, k and y is an integer which is at least 2;
a plurality of optical signal multiplexers each arranged to receive a respective optical signal from a plurality of the output ports and arranged to multiplex the received optical signals into an output wavelength division multiplexed optical signal; and a controller configured to generate a switch control signal arranged to cause a wavelength selective optical switch to change between the OFF state and the ON state.

10. An optical communication network element comprising a reconfigurable optical add drop multiplexer as claimed in claim 9.

11. A method of controlling reconfigurable optical switch apparatus, wherein the apparatus includes m input ports, m output ports, k add ports, and k drop ports, and a switch matrix comprising m×k wavelength selective optical switches arranged in m rows, each connected between a respective input port and a respective output port, and further arranged in k columns, each connected at one end to a respective drop port and at an opposite end to a respective add port, the method comprising:
selecting one of the input ports;
selecting one of the output ports and the drop ports to be connected to the selected input port;
selecting a path for an optical signal at a selected one of y wavelengths across the switch matrix from the selected input port to the selected one of the output ports and the drop ports;
generating and transmitting a switch control signal for each one of the wavelength selective optical switches required to change between an OFF state and an ON state to establish the selected path;
selecting one of the drop ports to be connected to the selected input port and selecting one of the add ports and one of the output ports to be connected;
selecting a first path for a first optical signal at a selected one of the y wavelengths across the switch matrix from the selected input port to the selected drop port and selecting a second path for a second optical signal at the selected wavelength across the switch matrix from the selected add port to the selected output port, wherein the first path and the second path share one of the wavelength selective optical switches; and
generating and transmitting a switch control signal for said shared wavelength selective optical switch, the switch control signal being arranged to cause said shared wavelength selective optical switch to be in the ON state to simultaneously establish the first path and the second path.

12. A method as claimed in claim 11, wherein the method further comprises:
selecting a further one of the input ports;
selecting a further one of the output ports to be connected to said further one of the input ports;
selecting a further path for a further optical signal at the selected wavelength across the switch matrix from said further one of the input ports to said further one of the output ports, the path being selected to include a selective optical switch in a column which does not form part of said path previously established for said optical signal at the selected wavelength; and
generating and transmitting a switch control signal for each wavelength selective optical switch required to change between the OFF state and the ON state to establish the further path.

13. A data carrier having computer readable instructions embodied therein, the computer readable instructions being for providing access to resources available on a processor, the computer readable instructions comprising instructions to cause the processor to perform the following operations on an apparatus, wherein the apparatus includes m input ports, m output ports, k add ports, and k drop ports, and a switch matrix comprising m×k wavelength selective optical switches arranged in m rows, each connected between a respective input port and a respective output port, and further arranged in k columns, each connected at one end to a respective drop port and at an opposite end to a respective add port, the operations comprising:

selecting one of the input ports;
  selecting one of the output ports and the drop ports to be connected to the selected input port;
  selecting a path for an optical signal at a selected one of y wavelengths across the switch matrix from the selected input port to the selected one of the output ports and the drop ports; and
  generating and transmitting a switch control signal for each one of the wavelength selective optical switches required to change between an OFF state and an ON state to establish the selected path;
  selecting one of the drop ports to be connected to the selected input port and selecting one of the add ports and one of the output ports to be connected; selecting a first path for a first optical signal at a selected one of the y wavelengths across the switch matrix from the selected input port to the selected the drop port and selecting a second path for a second optical signal at the selected wavelength across the switch matrix from the selected add port to the selected the output port, wherein the first path and the second path share one of the wavelength selective optical switches; and
  generating and transmitting a switch control signal for said shared wavelength selective optical switch, the switch control signal being arranged to cause said shared wavelength selective optical switch to be in the ON state to simultaneously establish the first path and the second path.

14. The data carrier of claim 13, wherein the operations further comprise:
  selecting a further one of the input ports;
    selecting a further one of the output ports to be connected to said further one of the input ports;
    selecting a further path for a further optical signal at the selected wavelength across the switch matrix from said further one of the input ports to said further one of the output ports, the path being selected to include a selective optical switch in a column which does not form part of said path previously established for a said optical signal at the selected wavelength; and
    generating and transmitting a switch control signal for each wavelength selective optical switch required to change between the OFF state and the ON state to establish the further path.

15. A method of controlling reconfigurable optical switch apparatus, wherein the apparatus includes m input ports, m output ports, k add ports, and k drop ports, and a switch matrix comprising m×k wavelength selective optical switches arranged in m rows, each connected between a respective input port and a respective output port, and further arranged in k columns, each connected at one end to a respective drop port and at an opposite end to a respective add port, the method comprising:
  selecting one of the input ports;
  selecting one of the drop ports to be connected to the selected input port and selecting one of the add ports and one of the output ports to be connected;
  selecting a first path for a first optical signal at a selected one of the y wavelengths across the switch matrix from the selected input port to the selected drop port and selecting a second path for a second optical signal at the selected wavelength across the switch matrix from the selected add port to the selected output port, wherein the first path and the second path share one of the wavelength selective optical switches; and
  generating and transmitting a switch control signal for said shared wavelength selective optical switch, the switch control signal being arranged to cause said shared wavelength selective optical switch to be in an ON state to simultaneously establish the first path and the second path.

16. A method as claimed in claim 15, wherein the method further comprises:
  selecting a further one of the input ports;
  selecting a further one of the output ports to be connected to said further one of the input ports;
  selecting a further path for a further optical signal at the selected wavelength across the switch matrix from said further one of the input ports to said further one of the output ports, the path being selected to include a selective optical switch in a column which does not form part of said path previously established for said optical signal at the selected wavelength; and
  generating and transmitting a switch control signal for each wavelength selective optical switch required to change between the OFF state and the ON state to establish the further path.

17. A data carrier having computer readable instructions embodied therein, the computer readable instructions being for providing access to resources available on a processor, the computer readable instructions comprising instructions to cause the processor to perform the following operations on an apparatus, wherein the apparatus includes m input ports, m output ports, k add ports, and k drop ports, and a switch matrix comprising m×k wavelength selective optical switches arranged in m rows, each connected between a respective input port and a respective output port, and further arranged in k columns, each connected at one end to a respective drop port and at an opposite end to a respective add port, the operations comprising:
  selecting one of the input ports;
  selecting one of the drop ports to be connected to the selected input port and selecting one of the add ports and one of the output ports to be connected;
  selecting a first path for a first optical signal at a selected one of the y wavelengths across the switch matrix from the selected input port to the selected the drop port and selecting a second path for a second optical signal at the selected wavelength across the switch matrix from the selected add port to the selected the output port, wherein the first path and the second path share one of the wavelength selective optical switches; and
  generating and transmitting a switch control signal for said shared wavelength selective optical switch, the switch control signal being arranged to cause said shared wavelength selective optical switch to be in an ON state to simultaneously establish the first path and the second path.

18. The data carrier of claim 17, wherein the operations further comprise:
  selecting a further one of the input ports;
    selecting a further one of the output ports to be connected to said further one of the input ports;
    selecting a further path for a further optical signal at the selected wavelength across the switch matrix from said further one of the input ports to said further one of the output ports, the path being selected to include a selective optical switch in a column which does not form part of said path previously established for a said optical signal at the selected wavelength; and generating and transmitting a switch control signal for each wavelength selective optical switch required to change between the OFF state and the ON state to establish the further path.

\* \* \* \* \*